US008791946B2

(12) United States Patent
Suzuki et al.

(10) Patent No.: US 8,791,946 B2
(45) Date of Patent: Jul. 29, 2014

(54) COMPUTER-READABLE STORAGE MEDIUM HAVING STORED THEREIN IMAGE PROCESSING PROGRAM, IMAGE PROCESSING APPARATUS, IMAGE PROCESSING SYSTEM, AND IMAGE PROCESSING METHOD

(75) Inventors: Toshiaki Suzuki, Kyoto (JP); Masaki Tawara, Kyoto (JP); Teruhiko Suzuki, Kai (JP); Eitaro Nakamura, Kai (JP)

(73) Assignees: Nintendo Co., Ltd., Kyoto (JP); Hal Laboratory, Tokyo (JP)

( * ) Notice: Subject to any disclaimer, the term of this patent is extended or adjusted under 35 U.S.C. 154(b) by 140 days.

(21) Appl. No.: 13/156,682

(22) Filed: Jun. 9, 2011

(65) Prior Publication Data
US 2012/0019520 A1 Jan. 26, 2012

(30) Foreign Application Priority Data
Jul. 21, 2010 (JP) .................................. 2010-164347

(51) Int. Cl.
*G06T 15/00* (2011.01)
*G06F 3/041* (2006.01)
*G01R 31/00* (2006.01)
*H04N 13/00* (2006.01)
*H04N 13/02* (2006.01)

(52) U.S. Cl.
CPC ....... *H04N 13/0011* (2013.01); *H04N 13/0271* (2013.01); *H04N 13/0239* (2013.01)
USPC ............................ 345/419; 345/178; 702/119

(58) Field of Classification Search
USPC ........................................................ 345/629
See application file for complete search history.

(56) References Cited

U.S. PATENT DOCUMENTS

| 6,201,517 B1 | 3/2001 | Sato | |
|---|---|---|---|
| 7,283,654 B2 * | 10/2007 | McLain | 382/128 |
| 2010/0194856 A1 * | 8/2010 | Varekamp | 348/42 |
| 2010/0253681 A1 * | 10/2010 | Kobayashi | 345/419 |
| 2011/0050864 A1 * | 3/2011 | Bond | 348/51 |

FOREIGN PATENT DOCUMENTS

| JP | 05-046076 | 2/1993 |
|---|---|---|
| JP | 7-200870 | 8/1995 |
| JP | 07-249114 | 9/1995 |
| JP | 10-239634 | 9/1998 |
| JP | 2008-015606 | 1/2008 |

* cited by examiner

*Primary Examiner* — Ke Xiao
*Assistant Examiner* — Kwang Lee
(74) *Attorney, Agent, or Firm* — Nixon & Vanderhye, P.C.

(57) ABSTRACT

For generating a destination image (a left-eye image) from an original image and a height map thereof, the height of the height map of the original image is compared with the height of the height map of the destination image, and if a pixel of the original image is higher, the pixel of the original image is copied to a pixel of the destination image. After the pixel of the original image is copied to the pixel of the destination image, the height of the pixel of the original image is decremented. The pixel of the original image is copied in the rightward direction to pixels of the destination image until the height of the pixel of the original image becomes 0 or until a height of the pixel of the destination image becomes lower than that of the pixel of the original image. The same processes are performed on each pixel of the original image, and thereby the left-eye image is generated.

15 Claims, 16 Drawing Sheets

HEIGHT MAP

|   | 1 | ... |   | j |   |   |   | m |
|---|---|---|---|---|---|---|---|---|
| 1 | 0 | 0 | 0 | 0 | 0 | 0 | 0 | 0 |
| . | 0 | 0 | 0 | 0 | 0 | 0 | 0 | 0 |
| . | 0 | 0 | 0 | 0 | 0 | 0 | 0 | 0 |
| i | 0 | 0 | 0 | 0 | 0 | 0 | 0 | 0 |
|   | 0 | 0 | 0 | 0 | 0 | 0 | 0 | 0 |
| n | 0 | 0 | 0 | 0 | 0 | 0 | 0 | 0 |

HEIGHT MAP

|  |  |  |  |  |  |  |  |  |
|---|---|---|---|---|---|---|---|---|
|  | 0 | 0 | 0 | 0 | 0 | 0 | 0 | 0 |
|  | 0 | 1 | 1 | 1 | 0 | 0 | 0 | 0 |
|  | 0 | 2 | 2 | 1 | 1 | -1 | -2 | -1 |
| ROW i | 5 | 1 | 2 | 1 | 0 | -1 | -3 | -1 |
|  | 1 | 2 | 2 | 1 | 0 | 0 | 0 | 0 |
|  | 0 | 1 | 1 | 0 | 0 | 0 | 0 | 0 |

F I G. 1 7
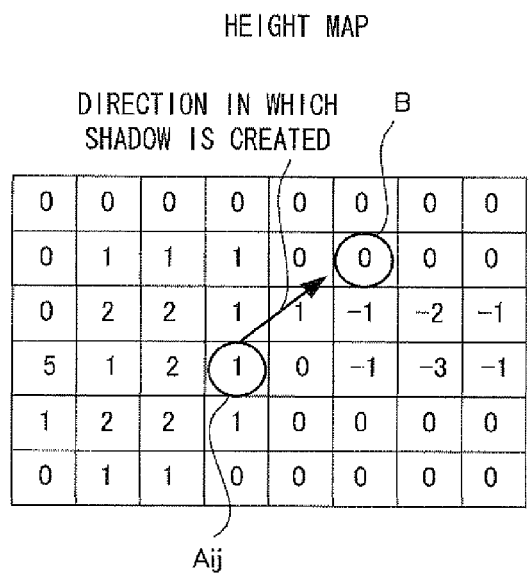
F I G. 1 8
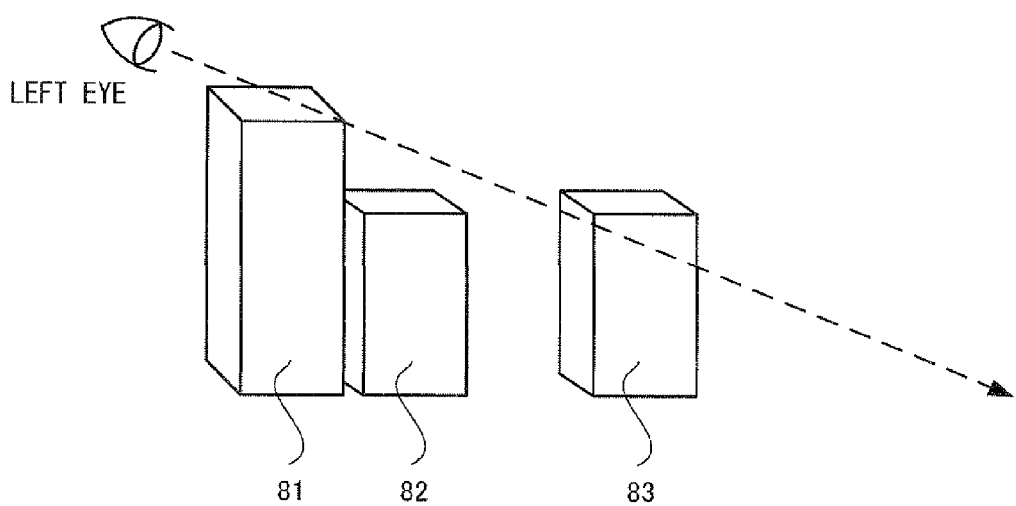

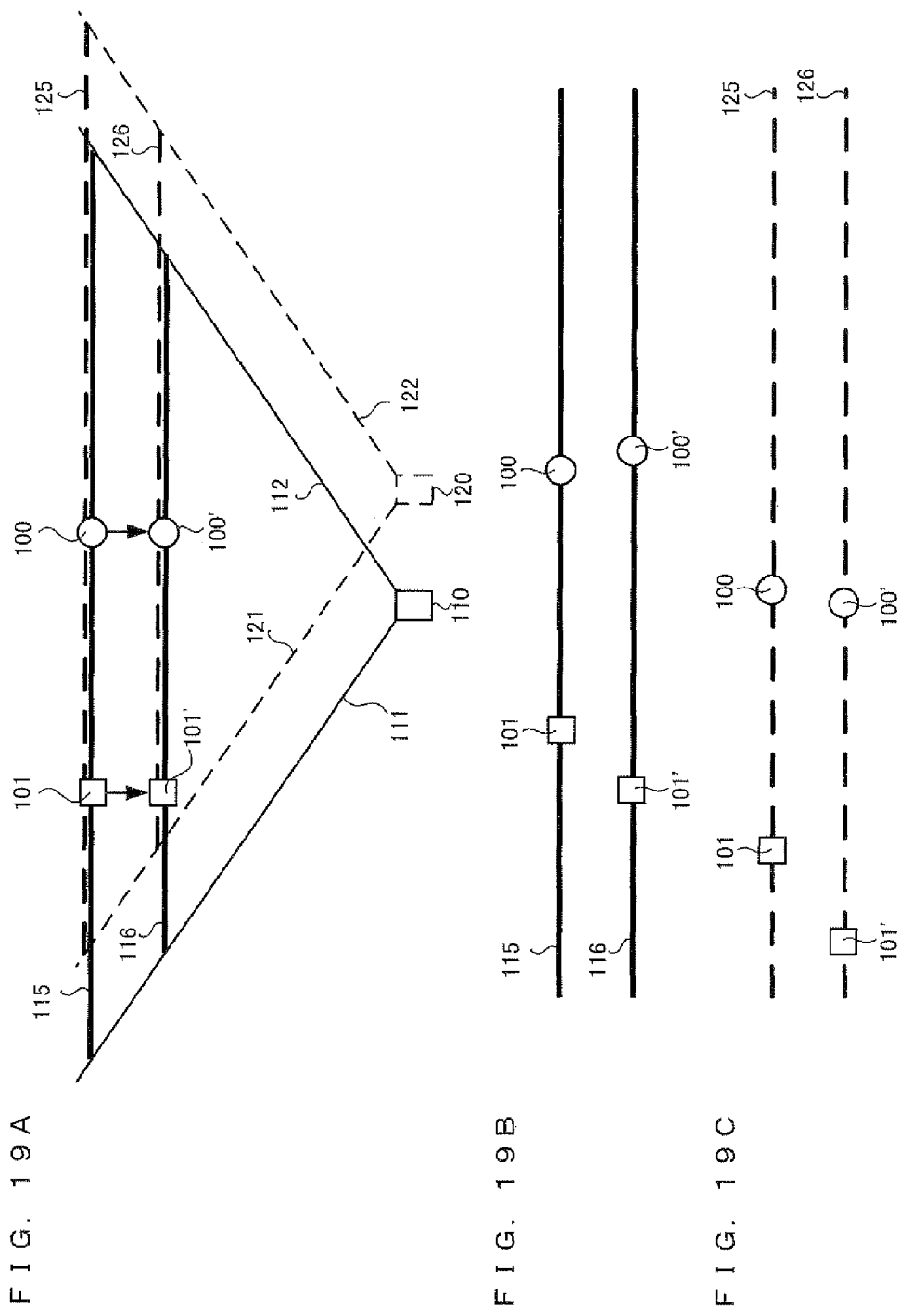

COMPUTER-READABLE STORAGE MEDIUM HAVING STORED THEREIN IMAGE PROCESSING PROGRAM, IMAGE PROCESSING APPARATUS, IMAGE PROCESSING SYSTEM, AND IMAGE PROCESSING METHOD

CROSS REFERENCE TO RELATED APPLICATION

The disclosure of Japanese Patent Application No. 2010-164347, filed on Jul. 21, 2010 is incorporated herein by reference.

BACKGROUND OF THE INVENTION

1. Field of the Invention

The present invention relates to a computer-readable storage medium having stored therein an image processing program for displaying a stereoscopically visible image by using respective images viewed with the left eye and the right eye, and an image processing apparatus, an image processing system, and an image processing method.

2. Description of the Background Art

Conventionally, apparatuses displaying respective images seen with the left eye and the right eye, thereby stereoscopically displaying an image have been proposed. For example, Japanese Laid-Open Patent Publication No. H7-200870 (hereinafter, referred to as Patent Literature 1) discloses an apparatus which generates, by the perspective projection transformation, an image in which a three-dimensional model is seen from one point of view, and shifts each pixel of the image in the left-right direction, in accordance with a position in the depth direction, and thereby a left-eye image and a right-eye image are generated. The generated left-eye and right-eye images are output to a display section and displayed as a stereoscopic image. As described above, in Patent Literature 1, the left and right images are generated by shifting each pixel of the image taken, by a virtual camera, of the three-dimensional model in the left-right direction, in accordance with the position in the depth direction.

In Patent Literature 1, however, each pixel of the image taken, by a virtual camera, of the three-dimensional model, is simply shifted in the left-right direction, in accordance with the position in the depth direction, thereby generating the left and right images. Because of this, the displayed stereoscopic image may end up being an image unpleasant to the eyes of a user or an image giving a user a sense of discomfort.

SUMMARY OF THE INVENTION

Therefore, an object of the present invention is to provide a computer-readable storage medium having stored therein an image processing program for generating a natural image with stereoscopic effects, an image processing apparatus, an image processing system, and an image processing method.

In order to achieve the object, the present invention employs the following features.

An embodiment of the present invention is a computer-readable storage medium having stored therein an image processing program executed by a computer of an image processing apparatus for generating a stereoscopically visible image. The image processing program causes the computer to function as: original image acquisition means, depth information storage means, and image generation means. The original image acquisition means acquires a predetermined original image. The depth information storage means stores depth information indicative of a subregion-by-subregion depth of the original image, in association with a corresponding subregion of the original image. The image generation means generates a left-eye image and a right-eye image by performing, on a subregion of the original image, a process of copying image data of the subregion of the original image to subregions of a destination image in the left-right direction within a range in accordance with the depth information of the subregion of the original image, the range starting from a subregion of the destination image, corresponding to the subregion of the original image.

According to the above configuration, the depth information of each subregion of the original image is stored in the depth information storage means. Then, the image data of the subregion of the original image is copied to the subregions of the destination image in the left-right direction within a range in accordance with the depth information of the subregion of the original image, starting from the subregion of the destination image, corresponding to the subregion of the original image. The copy process is then performed on each subregion of the original image, and thereby the left-eye image and the right-eye image can be generated. This allows the generation of the stereoscopically visible image in which the original image is altered in the direction perpendicular to the screen by using the depth information, and the generation of the stereoscopically visible image which gives a user no sense of discomfort.

Further, in another embodiment of the present invention, the depth information storage means may update the depth information in accordance with an input from an input means.

According to the above configuration, the depth information can be updated by an input made on the input means.

Further, in another embodiment of the present invention, the input means may be a designated coordinate detection means. In this case, the depth information storage means updates the depth information of the subregion, of the original image, which corresponds to a set of coordinates detected by the designated coordinate detection means.

According to the above configuration, the depth information can be updated by using the designated coordinate detection means.

Further, in another embodiment of the present invention, the image generation means may include determination means, copy means, and control means. In this case, the image generation means stores the depth information of the subregion of the destination image which is an image to be generated. The determination means performs a process of comparing the depth information of the subregion of the original image with the depth information of the subregion of the destination image and determining whether the subregion of the original image has a smaller depth than the subregion of the destination image. The copy means performs a process of copying the subregion of the original image to the subregion of the destination image and also copying the depth information of the subregion of the original image to the depth information of the subregion of the destination image, in the case where a determination result is affirmative. The control means causes the determination means to execute the process of determining and causes the copy means to perform the process of copying on each subregion of the original image.

According to the above configuration, during a course of copying the subregion of the original image to the subregion of the destination image, the depth information of the subregion of the original image is compared with the depth information of the subregion of the destination image, and determination can be made whether the subregion of the original image has a smaller depth than the subregion of the destination image (whether the subregion of the original image is positioned in the frontward direction of the display screen as compared to the subregion of the destination image). If the determination result is affirmative, the subregion of the original image can be copied to the subregion of the destination image. This allows the generation of a realistic and natural stereoscopically visible image because the subregion positioned in the frontward direction of the display screen takes precedence over the subregion positioned in the depth direction of the display screen.

Further, in another embodiment of the present invention, the image generation means may include control means, determination means, and copy means. In this case, the image generation means stores depth information of a subregion of the destination image which is an image to be generated. The control means specifies a subregion of the original image and specifies a subregion of the destination image which corresponds to the subregion of the original image. The determination means performs a process of comparing the depth information corresponding to the subregion of the original image with the depth information of the subregion of the destination image specified by the control means, and determining whether the subregion of the original image has a smaller depth than the subregion of the destination image. The copy means performs a process of copying the subregion of the original image to the subregion of the destination image and also copying the depth information of the subregion of the original image to the depth information of the subregion of the destination image, in a case where a determination result by the determination means is affirmative. The control means specifies a subregion to the right of the subregion, which is currently specified, of the destination image as a next subregion of the destination image when generating the left-eye image, and causes the determination means and the copy means to execute the respective processes in a case where the depth information of the subregion of the original image indicates a position in a frontward direction of a display screen. Also, the control means specifies a subregion to the left of the currently specified subregion of the destination image as the next subregion of the destination image when generating the right-eye image, and causes the determination means and the copy means to execute the respective processes in a case where the depth information of the subregion of the original image indicates a position in a frontward direction of a display screen. The control means specifies the subregion to the left of the currently specified subregion of the destination image as the next subregion of the destination image when generating the left-eye image, and causes the determination means and the copy means to execute the processes in a case where the depth information of the subregion of the original image indicates a position in a depth direction of the display screen. Also, the control means specifies the subregion to the right of the currently specified subregion of the destination image as the next subregion of the destination image when generating the right-eye image, and causes the determination means and the copy means to execute the processes in a case where the depth information of the subregion of the original image indicates a position in a depth direction of the display screen. Furthermore, the control means causes the determination means and the copy means to execute the respective processes on a next subregion of the original image in the case where the processes on the subregion of the original image end.

According to the above configuration, in the case where, for example, an image to be generated is the left-eye image, the subregion of the original image can be copied to the subregions of the destination image subsequently in the rightward direction if the depth information indicates a position in the frontward direction of the display screen (if the height is a positive value), and the subregion of the original image can be copied to the subregions of the destination image subsequently in the leftward direction if the depth information is positioned in the depth direction of the display screen (if the height is a negative value). During a course of copying the subregion of the original image to the subregion of the destination image, the subregion of the original image can be copied to the subregion of the destination image only in the case where the subregion of the original image is positioned in the frontward direction of the display screen as compared to the subregion of the destination image (the subregion of the original image has a smaller depth than the subregion of the destination image). This allows the generation of a realistic and natural stereoscopically visible image because the subregion positioned in the frontward direction of the display screen takes precedence over the subregion positioned in the depth direction of the display screen.

Further, in another embodiment of the present invention, in the case where the determination means determines that the subregion of the original image has a larger depth than the subregion of the destination image, the control means may end the processes on the subregion of the original image and execute the processes on a next subregion of the original image.

According to the above configuration, the processes on the subregion of the original image can be ended at a time point when it is determined that the subregion of the original image has a larger depth than the subregion of the destination image. For example, in the case where the subregion of the original image is copied to the subregions of the destination image subsequently in the rightward direction, when the process reaches the subregion of the destination image which has a smaller depth than the subregion of the original image, the following copy process on the subregion of the original image can be ended. This allows the generation of more realistic and natural stereoscopically visible image.

Further, in another embodiment of the present invention, the image processing program may further cause the computer to function as depth change means. The depth change means changes the depth information corresponding to the subregion of the original image in accordance with the subregion of the destination image being distanced away from a position of the subregion of the original image, so that a depth of the subregion of the original image becomes closer to that of the display screen. Then, the determination means compares the depth information corresponding to the subregion of the original image changed by the depth change means with the depth information of the subregion of the destination image to determine whether the subregion of the original image after the depth information thereof is changed has a smaller depth than the subregion of the destination image.

According to the above configuration, for example, the depth of the subregion of the original image can be decremented or incremented in accordance with the subregion of the destination image being distanced away from the position of the subregion of the original image. This prevents occurrence of too much effects of the subregions having relatively small depths, which allows the generation of more natural stereoscopically visible image.

Further, in another embodiment of the present invention, the image processing program may further cause the computer to function as emboss process means. The emboss process means generates a grayscale image having intensity information by using the depth information of each subregion and the depth information of a subregion present at a position in a predetermined direction from a position of the subregion, and synthesizing the generated grayscale image with the left-eye image and the right-eye image by texture mapping.

According to the above configuration, the emboss process can be performed on the left-eye image and the right-eye image by using the depth information, and which causes creation of shadow for the left-eye image and the right-eye image in accordance with the depth information. This allows the generation of an image having more stereoscopic effects.

Further, in another embodiment of the present invention, the depth information storage means may store a grayscale value of a subregion as the depth information. In this case, the emboss process means generates the grayscale image in accordance with a difference between the grayscale value of the subregion stored in the depth information storage means and a grayscale value of a subregion present at a position in the predetermined direction from a position of the subregion stored in the depth information storage means.

According to the above configuration, values of the depth information stored in the depth information storage means can be used for the emboss process as they are.

Further, in another embodiment of the present invention, the image processing apparatus may be the realization of the means described above. Alternatively, in the present invention, a plurality of aspects, which realize the above means, may interact with one another, thereby being configured as one image processing apparatus. The image processing apparatus may be configured of a single apparatus, or may be configured of a plurality of apparatuses.

According to the present invention, a stereoscopically visible image which is natural and has stereoscopic effects can be generated.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a diagram illustrating calculation of a grayscale value in the emboss process;

FIG. 18 is a conceptual diagram showing how pixels of a left-eye image generated by the process in the present embodiment are viewed;

FIG. 19A is a diagram showing objects present in a real space and a point of view of a user which are seen from above the space;

FIG. 19B is a diagram showing an extent in the horizontal direction to which a left eye 110 can see before and after movement of objects, and respective positions of the objects in the horizontal direction in an image displayed onto the left eye 110 are shown; and FIG. 19C is a diagram showing an extent in the horizontal direction to which a right eye 120 can see before and after movement of the objects, and respective positions of the objects in the horizontal direction in an image displayed onto the right eye 120 are shown.

DESCRIPTION OF THE PREFERRED EMBODIMENTS

Structure of Game Apparatus

Figure 1:
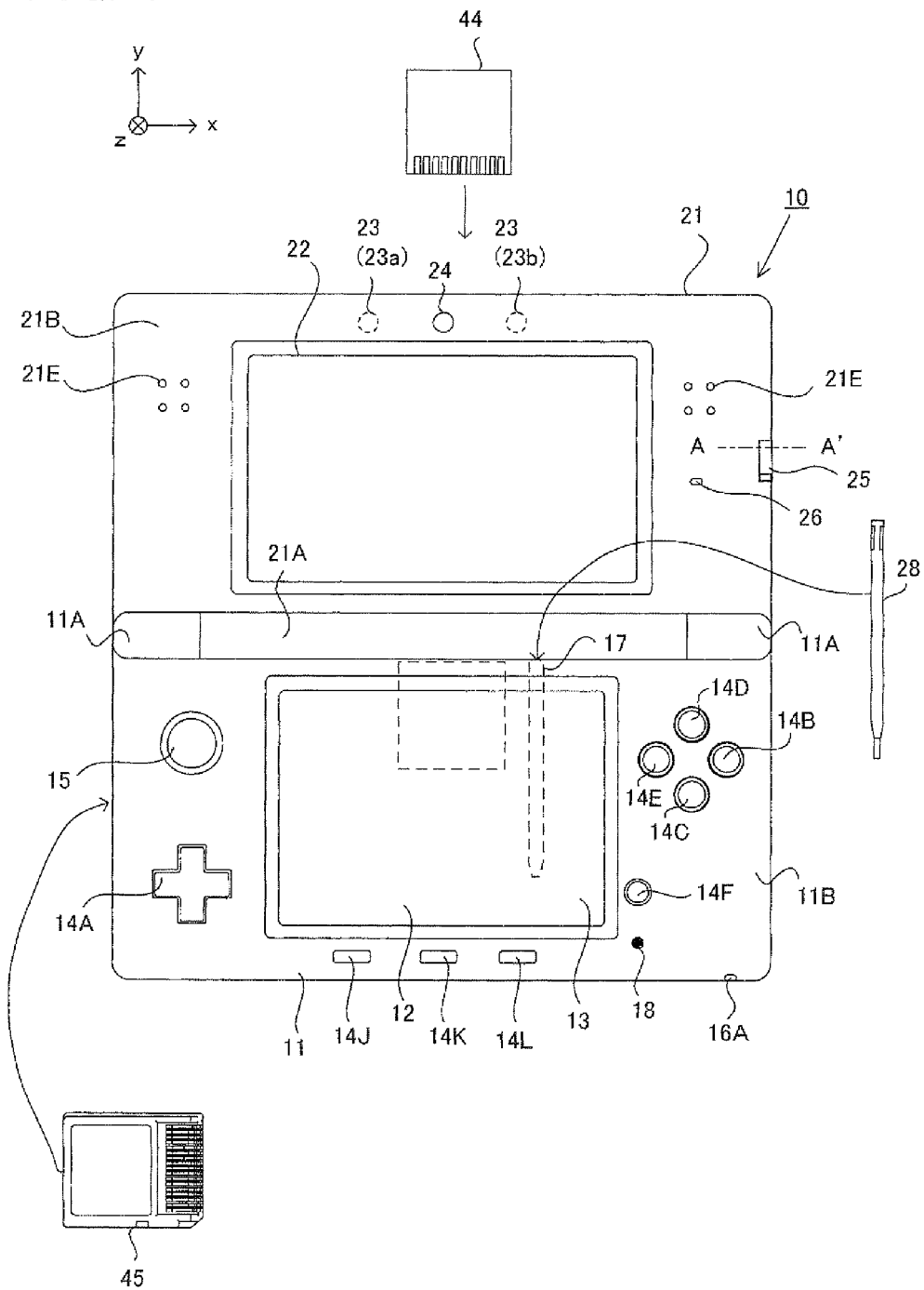
FIG. 1 is a front view of a game apparatus 10 in an opened state.
Figure 2:
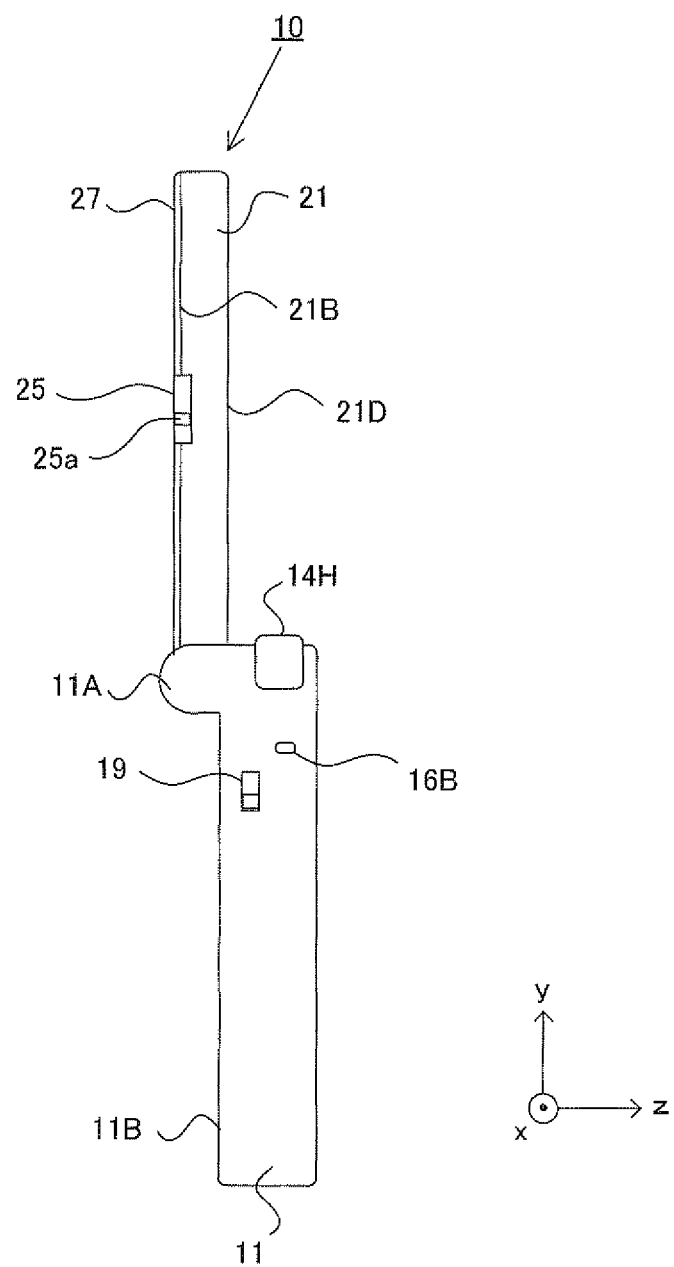
FIG. 2 is a side view of the game apparatus 10 in the opened state.
Figure 3:
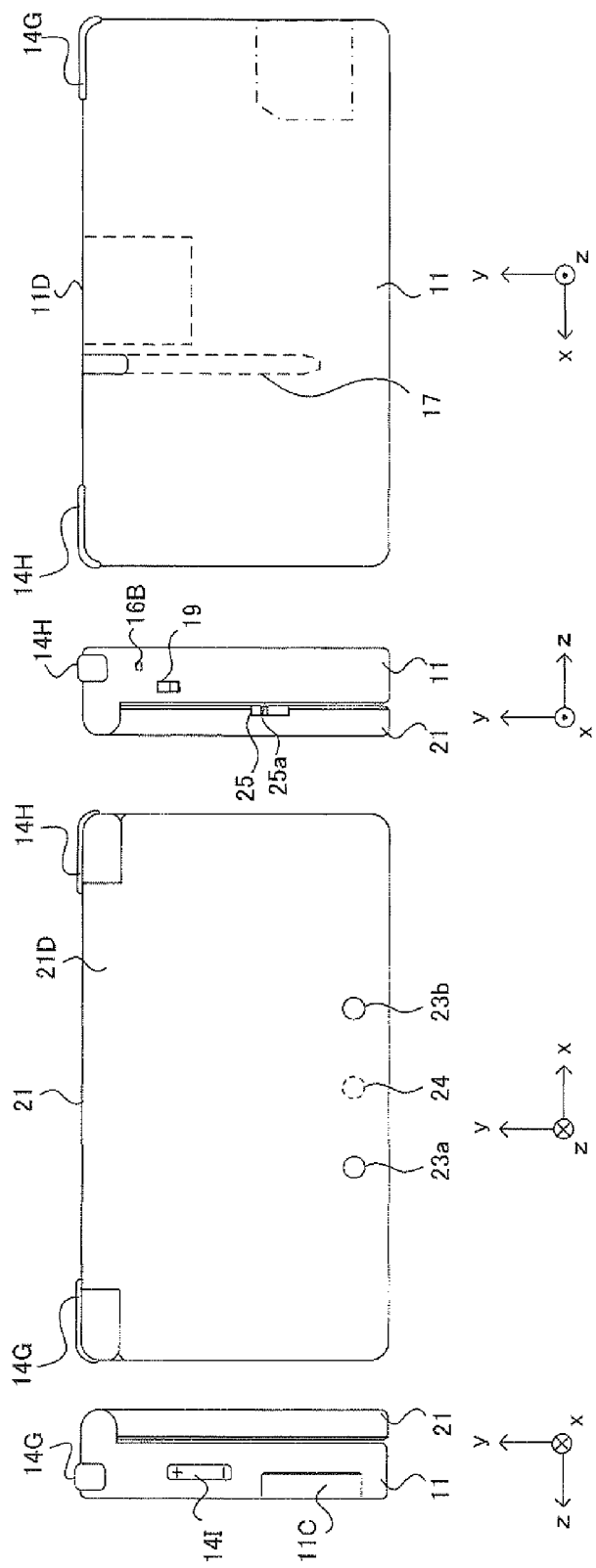
FIG. 3A is a left side view of the game apparatus 10 in a closed state.
FIG. 3B is a front view of the game apparatus 10 in the closed state.
FIG. 3C is a right side view of the game apparatus 10 in the closed state.
FIG. 3D is a rear view of the game apparatus 10 in the closed state.

Hereinafter, a game apparatus according to one embodiment of the present invention will be described. FIG. 1 to FIG. 3D are each a plan view of an outer appearance of a game apparatus 10. The game apparatus 10 is a hand-held game apparatus, and is configured to be foldable as shown in FIG. 1 to FIG. 3D. FIG. 1 and FIG. 2 show the game apparatus 10 in an opened state, and FIG. 3A to FIG. 3D each show the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 3D. The game apparatus 10 includes a lower housing 11 and an upper housing 21 as shown in FIG. 1 to FIG. 3D. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3D, in the lower housing 11, a lower LCD (Liquid Crystal Display) 12, a touch panel 13, operation buttons 14A to 14L (FIG. 1, FIG. 3A to FIG. 3D), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for a selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, i.e., the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 4) is provided as a sound input device described below, and the microphone detects for a sound from the outside of the game apparatus 10.

FIG. 3A is a left side view of the game apparatus 10 in the closed state. FIG. 3B is a front view of the game apparatus 10 in the closed state. FIG. 3C is a right side view of the game apparatus 10 in the closed state. FIG. 3D is a rear view of the game apparatus 10 in the closed state. As shown in FIG. 3B and FIG. 3D, an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. Further, as shown in FIG. 3A, a sound volume button 14I is provided on the left side surface of the lower housing 11. The sound volume button 14I is used for adjusting a sound volume of a speaker of the game apparatus 10.

As shown in FIG. 3A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3D, an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening HD may be provided on another side surface (for example, the right side surface) of the lower housing 11.

Further, as shown in FIG. 1 and FIG. 3C, a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE 802.11.b/g standard. A wireless switch 19 for enabling/disabling the function of the wireless communication is provided on the right side surface of the lower housing 11 (see FIG. 3C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Further, as shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line× the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image (the stereoscopically visible image, the stereoscopic image). Further, in the present embodiment, a left-eye image and a right-eye image are displayed by using substantially the same display area. Specifically, the upper LCD 22 may be a display device using a method in which the left-eye image and the right-eye image are alternately displayed in the horizontal direction in predetermined units (for example, every other line). Alternatively, a display device using a method in which the left-eye image and the right-eye image are alternately displayed for a predetermined time period may be used. Further, in the present embodiment, the upper LCD 22 is a display device capable of displaying an image which is stereoscopically visible with the naked eye. A lenticular lens type display device or a parallax barrier type display device is used which enables the left-eye image and the right-eye image, which are alternately displayed in the horizontal direction, to be separately viewed by the left eye and the right eye, respectively. In the present embodiment, the upper LCD 22 of a parallax barrier type is used. The upper LCD 22 displays, by using the left-eye image and the right-eye image, an image (a stereoscopic image) which is stereoscopically visible with the naked eye. That is, the upper LCD 22 allows a user to view the left-eye image with her/his left eye, and the right-eye image with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images taken by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3B, the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a takes a left-eye image, which is viewed with the user's left eye, and the outer imaging section (right) 23b takes a right-eye image, which is viewed by the user's right eye. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3B, the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3B represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3D, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

The 3D adjustment switch 25 is provided so as to be visible from the front surface and the right side surface of the upper housing 21 as shown in FIG. 1 and FIG. 2. A slider 25a of the 3D adjustment switch 25 is slidable to any position in a predetermined direction (along the longitudinal direction of the right side surface), and a display mode of the upper LCD 22 may be determined or the stereoscopic effect of the stereoscopic image may be adjusted, in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 4:
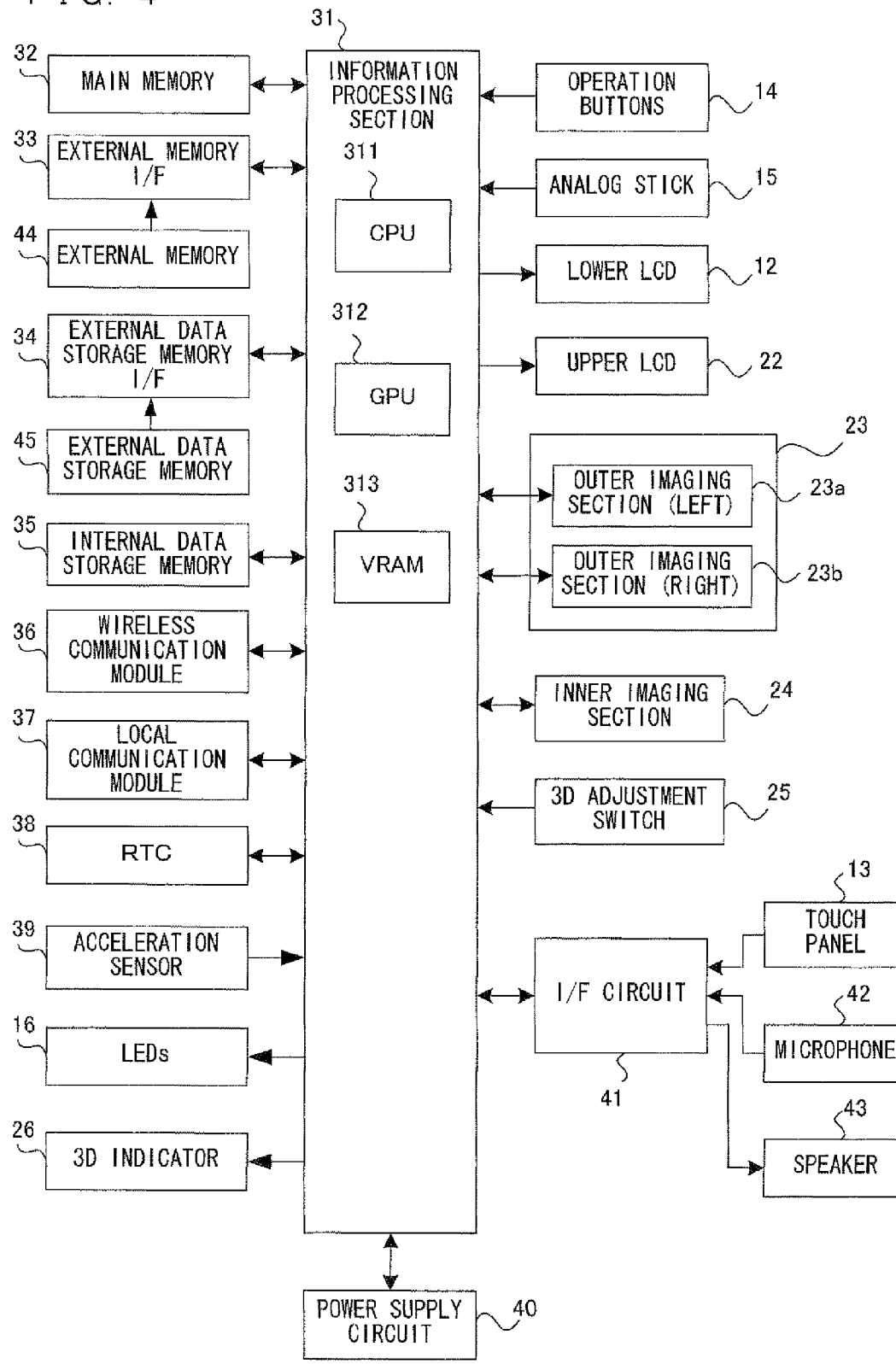
FIG. 4 is a block diagram illustrating an internal configuration of the game apparatus 10.

Next, an internal electrical configuration of the game apparatus 10 will be described with reference to FIG. 4. FIG. 4 is a block diagram illustrating an internal configuration of the game apparatus 10. As shown in FIG. 4, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 44 connected to the external memory I/F 33 or the internal data storage memory 35) inside the game apparatus 10. The CPU 311 of the information processing section 31 executes the predetermined program, thereby executing an image processing (FIG. 12) described below. The program executed by the CPU 311 of the information processing section 31 may be acquired from another device through communication with another device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the image processing, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. Far example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 receives data (acceleration data) representing accelerations detected by the acceleration sensor 39, and detects an orientation and a motion of the game apparatus 10. In the present embodiment, the information processing section 31 determines the orientation (tilt) of the game apparatus 10, based on the accelerations detected by the acceleration sensor 39.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed.

The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31.

Specifically, the information processing section 31 is connected to an LCD controller (not shown) of the upper LCD 22, and causes the LCD controller to set the parallax barrier to ON or OFF. When the parallax barrier is set to ON in the upper LCD 22, the right-eye image and the left-eye image, which are stored in the VRAM 313 of the information processing section 31 are outputted to the upper LCD 22. More specifically, the LCD controller alternately repeats reading of pixel data of the right-eye image for one line in the vertical direction, and reading of pixel data of the left-eye image for one line in the vertical direction, thereby reading, from the VRAM 313, the right-eye image and the left-eye image. Thus, an image to be displayed is divided into the images for the right eye and the images for the left eye each of which is a rectangle-shaped image having one line of pixels aligned in the vertical direction, and an image, in which the rectangle-shaped left-eye image which is obtained through the division, and the rectangle-shaped right-eye image which is obtained through the division are alternately aligned, is displayed on the screen of the upper LCD 22. A user views the images through the parallax barrier in the upper LCD 22 so that the right-eye image is viewed with the user's right eye, and the left-eye image is viewed with the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31 and output data of the taken image to the information processing section 31. For example, the information processing section 31 instructs one of the outer imaging section 23 and the inner imaging section 24 to take an image, and the imaging section that receives the instruction takes an image and transmits data of the taken image to the information processing section 31. For example, the imaging section to be used is selected by a touch operation by a user using the touch panel 13. When the information processing section 31 (the CPU 311) detects the selection of the imaging section, the information processing section 31 instructs the selected one of the outer imaging section 23 and the inner imaging section 24 to take an image.

The 3D adjustment switch 25 is connected to the information processing section 31. The 3D adjustment switch 25 transmits, to the information processing section 31, an electrical signal in accordance with the position of the slider 25*a*.

The 3D indicator 26 is connected to the information processing section 31. The information processing section 31 controls whether or not the 3D indicator 26 is to be lit up. In the present embodiment, the information processing section 31 lights up the 3D indicator 26 when the upper LCD 22 is in the stereoscopic display mode. The game apparatus 10 has the internal configuration as described above.

(Outline of Image Processing)

Next, an outline of an image processing according to the present embodiment will be described. In the present embodiment, an image (hereinafter, also referred to as original image) initially displayed on the upper LCD 22 transforms in the frontward direction or depth direction of the screen by an operation performed by the user. For example, the user performs a touch operation on the lower LCD 12 by holding the lower housing 11 with the left hand and holding the touch pen 28 with the right hand. Specifically, the user first selects an item from a plurality of items displayed on the lower LCD 12 by performing a touch operation, using the touch pen 28. Next, the user touches on the screen of the lower LCD 12 by using the touch pen 28. A position, in the image displayed on the upper LCD 22, which corresponds to the touch position on the lower LCD 12 alters then. For example, in the case where the user selects a stamp item and if the user touches a predetermined position on the lower LCD 12, the image displayed on the upper LCD 22 alters such that a position (a predetermined region based on the position) on the upper LCD 22, which corresponds to the predetermined position, is recessed in the depth direction of the screen by a predetermined amount. Alternatively, in the case where the user selects a pen item and if the user touches a predetermined position on the lower LCD 12, the image alters such that a position (a predetermined region based on the position), on the upper LCD 22, which corresponds to the predetermined position, projects out in the frontward direction of the screen by a predetermined amount. How the image alters is previously determined in accordance with the item. For example, depending on the type of the selected stamp item, the image may alter such that a position corresponding to the touch position projects out in the frontward direction of the screen, or depending on the type of the selected pen item, the image may alter such that a position corresponding to the touch position is recessed in the depth direction of the screen.

Figure 5:
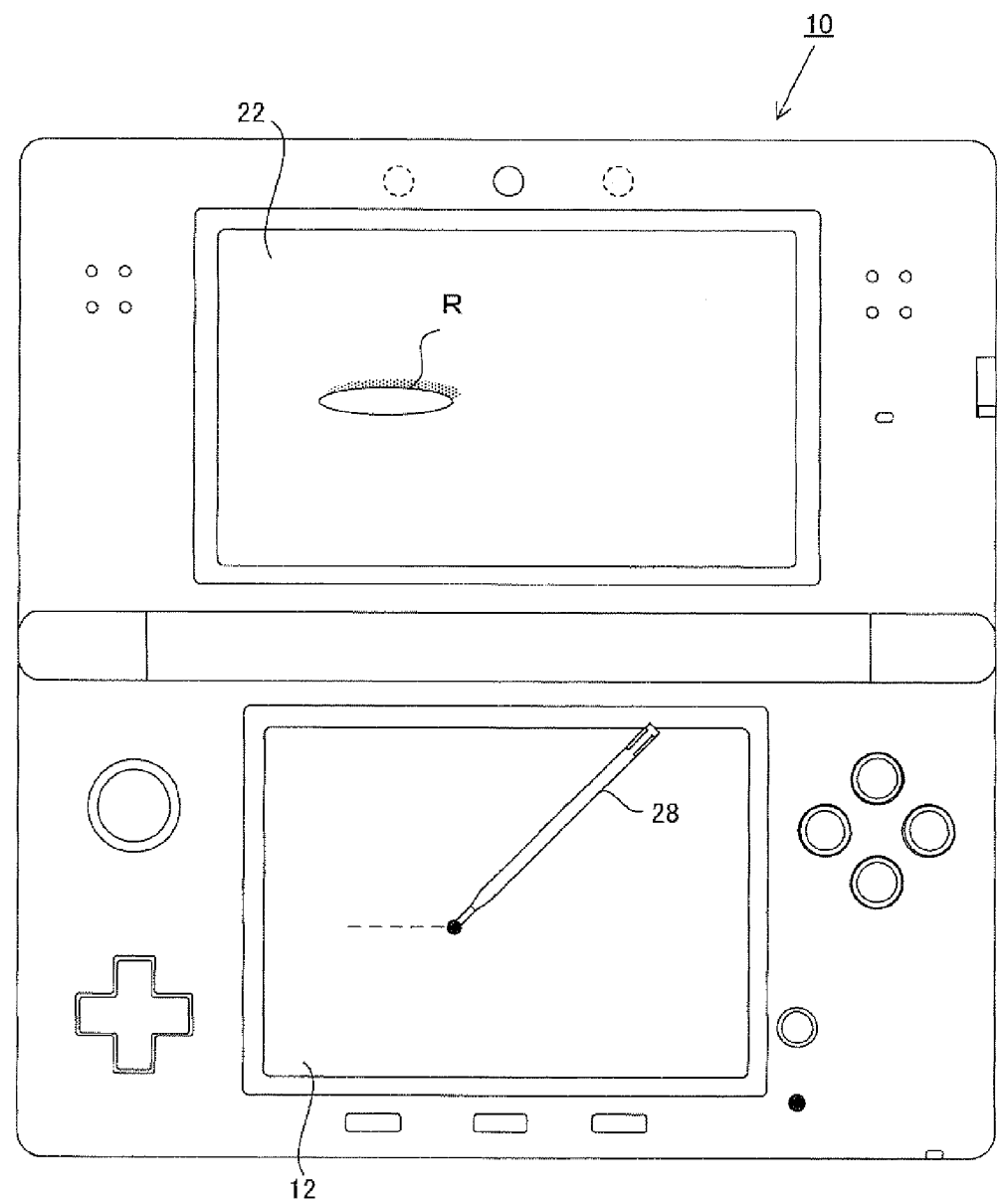
FIG. 5 is a diagram showing an example of images displayed on respective screens when an image processing according to the present embodiment is performed.

FIG. 5 is a diagram showing an example of an image displayed on the screen when the image processing according to the present embodiment is performed. A planar image as a background image is previously displayed on the upper LCD 22 in FIG. 5. For example, in the case where the user selects the pen item, if the user moves the touch pen along the screen of the lower LCD 12 while touching on the screen by the touch pen, the image on the upper LCD 22 alters as if a region corresponding to the trajectory of the touch pen projects out in the frontward direction of the screen. A dashed line shown on the lower screen (the lower LCD 12) in FIG. 5 indicates the trajectory drawn by the user using the touch pen. The trajectory is not actually displayed on the lower LCD 12. As shown in FIG. 5, a region R on the upper LCD 22, which corresponds to the trajectory, is displayed in accordance with the trajectory drawn on the lower screen such that the region R projects out in the frontward direction of the screen. That is, when the upper LCD 22 is seen in the case where the user draws such trajectory on the lower screen, it appears as if the region R of the background image displayed on the upper LCD 22 projects out in the frontward direction of the screen and portions other than the region R are displayed on the screen. It appears as if, for example, a portion of the region R which corresponds to the trajectory drawn on the lower screen most projects out in the frontward direction and the region R has a shape like a mountain forming a gentle gradient descending from the portion corresponding to the trajectory toward the periphery of the region R. As described above, in the present embodiment, it appears as if the image displayed on the upper LCD 22 transforms in a direction perpendicular to the screen (the frontward or the depth direction), in accordance with the operation performed by the user. That is, the planar image initially displayed on the upper LCD 22 alters into a stereoscopic image (a stereoscopically visible image) by the operation performed by the user. Alternatively, a stereoscopic image, which is initially displayed on the upper LCD 22, may transform in the frontward direction or depth direction of the screen by the operation performed by the user.

Hereinafter, how the image displayed on the upper LCD 22 alters will be described, assuming that the original image is not a stereoscopic image (a stereoscopically visible image) but a planar image. A planar image is initially displayed on the upper LCD 22. That is, the same original image is initially displayed on the upper LCD 22 as the right-eye image and the left-eye image, and the right-eye image is viewed with the user's right eye and the left-eye image is viewed with the user's left eye through the parallax barrier in the upper LCD 22. Since the right-eye image and the left-eye image are initially the same image, when the user sees the upper LCD 22, the user recognizes the images as the planar image. Then, the right-eye image and the left-eye image having differing parallax are generated in accordance with the touch operation performed by the user on the screen of the lower LCD 12, and the generated two images are displayed on the upper LCD 22. That is, the right-eye image and the left-eye image alter in accordance with the touch operation performed on the screen (the touch panel 13) of the lower LCD 12 so as to become different from each other, and are displayed on the upper LCD 22. For example, a pixel at the position corresponding to the touch position on the lower LCD 12 is moved in the leftward direction, and thereby the right-eye image is generated, and a pixel at the position corresponding to the touch position on the lower LCD 12 is moved in the rightward direction, and thereby the left-eye image is generated. This causes a parallax at the position corresponding to the touch position, and, when the two images are displayed on the upper LCD 22, it appears as if the position corresponding to the touch position projects out in the frontward direction of the screen. The display mode for the upper LCD 22 may be initially set to the planar display mode and an original image may be displayed on the upper LCD 22. In this case, the right-eye image and the left-eye image may be generated, in accordance with the operation performed by the user on the touch panel 13 and the display mode for the upper LCD 22 may also be set to the stereoscopic display mode.

Figures 6, 7, 8:
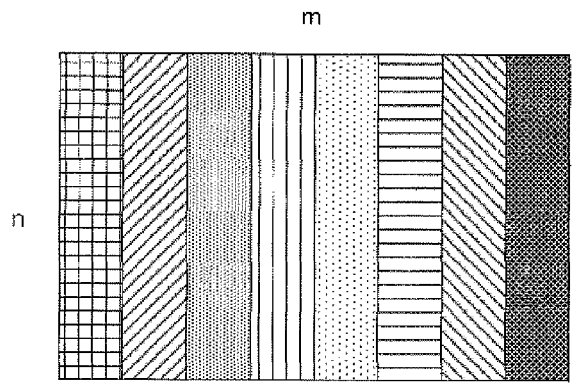
FIG. 6 is a diagram showing an example of an original image initially displayed on an upper LCD 22.
FIG. 7 is a diagram showing a height map before a touch operation is performed on a lower LCD 12.
FIG. 8 is a diagram showing an example of a height map after the touch operation is performed on the lower LCD 12.

FIG. 6 is a diagram showing an example of the original image which is initially displayed on the upper LCD 22. The original image shown in FIG. 6 is merely an example, and, an image used as the original image may be an image (a picture) taken by the inner imaging section 24, an image taken by either of the outer imaging section (left) 23a and the outer imaging section (right) 23b which are the components of the outer imaging section 23, a stereoscopic image taken by the outer imaging section 23, an image (a stereoscopic image or a planar image) of the virtual space which is taken by the virtual camera arranged in the virtual space, or a previously provided picture or a CG picture.

In the present embodiment, a height map is set to the original image, and by using the height map and the original image, the right-eye image and the left-eye image are generated. FIG. 7 is a diagram showing the height map before the touch operation is performed on the lower LCD 12. As shown in FIG. 7, the height map is set to the original image. Here, the height map is a map which indicates a position, of each pixel of the original image, in the direction perpendicular to the screen of the upper LCD 22. The height map is represented by n×m (row×column) where n is the number of pixels of the original image in the vertical direction and m is the number of pixels of the original image in the horizontal direction. As shown in FIG. 7, each element (height) hij of the height map is initially set to be 0. It should be noted that i is any integer in the range of 1 to n, and j is any integer in the range of 1 to m. Height information on each pixel (i, j) of the original image is stored in the range of 0 to 255 (8 bit) in each element hij of the height map. Here, the height information is information which indicates a degree of projection of the element in the frontward direction of the screen of the upper LCD 22. Specifically, the degree of projection in the frontward direction of the screen of the upper LCD 22 is indicated in terms of 16 grades (in the range of −8 to 7). The degree of projection is a value obtained by dividing a height information value by 16 and represented in terms of the 16 grades (in the range of −8 to 7). For example, in the case where the degree of projection is 0 (that is, the height information value is 128), the pixel is displayed on the screen (it appears as if the pixel is present on the screen). Further, in the case where the degree of projection is, for example, positive (for example, 7. That is, the height information value is any value in the range of 239 to 255), the pixel is displayed in front of the screen (it appears as if the pixel is projecting out in the frontward direction of the screen). Further, in the case where the degree of projection is, for example, negative (for example, −8. That is, the height information value is any value in the range of 0 to 15), the pixel is displayed in the depth direction of the screen (it appears as if the pixel is present at a position in the depth direction of the screen).

Here, the "height" refers to a display position (a display position sensed by the user) of the pixel of the original image in the direction perpendicular to the screen. An expression, such as "pixel A is higher (or lower) than pixel B", or "the height of pixel A is larger (or smaller) than the height of pixel B", indicates that, in the case where the user sees the pixel A and the pixel B displayed on the screen of the upper LCD 22, the user feels as if the pixel A is positioned in the frontward direction (or the depth direction) of the screen as compared to the pixel B. That is, the "height" indicates a distance in a direction extending from the screen of the upper LCD 22 toward the user. The user feels as if a pixel is projecting out from the screen if the pixel has the "height" that is positive, and the user feels as if a pixel is recessed farther than the screen is if the pixel has the "height" that is negative. The "height (height information)" can also be expressed as "depth (depth information)". The "depth" indicates a display position (a display position sensed by the user) of the pixel of the original image in the depth direction of the screen. An expression, such as "the pixel A is deeper than the pixel B" or "the depth of the pixel A is larger than the depth of the pixel B", indicates that, in the case where the user sees the pixel A and the pixel B displayed on the screen of the upper LCD 22, the user feels as if the pixel A is positioned in the depth direction of the screen as compared to the pixel B. On the contrary, an expression, such as "the pixel A is shallower than the pixel B" or "the depth of the pixel A is smaller than the depth of the pixel B", indicates that, in the case where the user sees the pixel A and the pixel B displayed on the screen of the upper LCD 22, the user feels as if the pixel A is positioned in the frontward direction of the screen as compared to the pixel B. In the case of a pixel having the "depth" that is positive, the user feels as if the pixel is recessed farther than the screen, and in the case of a pixel having "depth" that is negative, the user feels as if the pixel is projecting out from the screen. That is, the "height" being positive corresponds to the "depth" being negative, and the "height" being negative corresponds to the "depth" being positive. Hereinafter, a terminology which indicates the display position in the direction perpendicular to the screen is referred to the "height", according to common terminology.

The height information which is stored in each element of the height map may be represented in terms of, for example, 16 bit. Further, the degree of projection in the frontward direction of the screen of the upper LCD 22 is not limited to the 16 grades, and may be represented in terms of the same grade as an upper limit value of each element of the height map. Further, the height information may not necessarily be stored in a two-dimensional array, and may be stored in, for example, a one-dimensional array (it is not necessary to store the height information in a map form.

FIG. 8 is a diagram showing an example of the height map after the touch operation is performed on the lower LCD 12 (the touch panel 13). Although the height information on each element hij is represented in terms of the 16 grades (in the range of −8 to 7) (that is, the degree of projection is indicated) in FIG. 8, a value of each height hij is actually represented in the range of 0 to 255. As shown in FIG. 8, when the touch operation on the lower LCD 12 is performed, the height map is updated and a positive value or a negative value is stored in each element hij. Each element hij is updated in accordance with the touch operation performed on the lower LCD 12. That is, the element hij changes to a positive value or a negative value, in accordance with the touch position on the lower LCD 12 and the type of the item selected at the time when the touch operation is performed. For example, in the case where the pen item, which is used to cause the original image to project out from the screen, is selected, if the user touches near the center of the lower LCD 12, an element (for example, h44) which is at the center among the elements of the height map is increased by a predetermined value (for example, 1). Depending on the selected item, the element hij decreases by a predetermined amount (for example, 1). In addition, depending on the selected item, a plurality of elements hij within a predetermined region corresponding to the touch position detected by the touch panel 13 decrease or increase by a predetermined value. Further, the touch panel 13 detects touch position at predetermined time intervals, thus, if the same position is continuously touched for a predetermined time period, a value of the height hij corresponding to the position becomes large (or small), depending on the time period for which the touch is continued.

Figure 9:
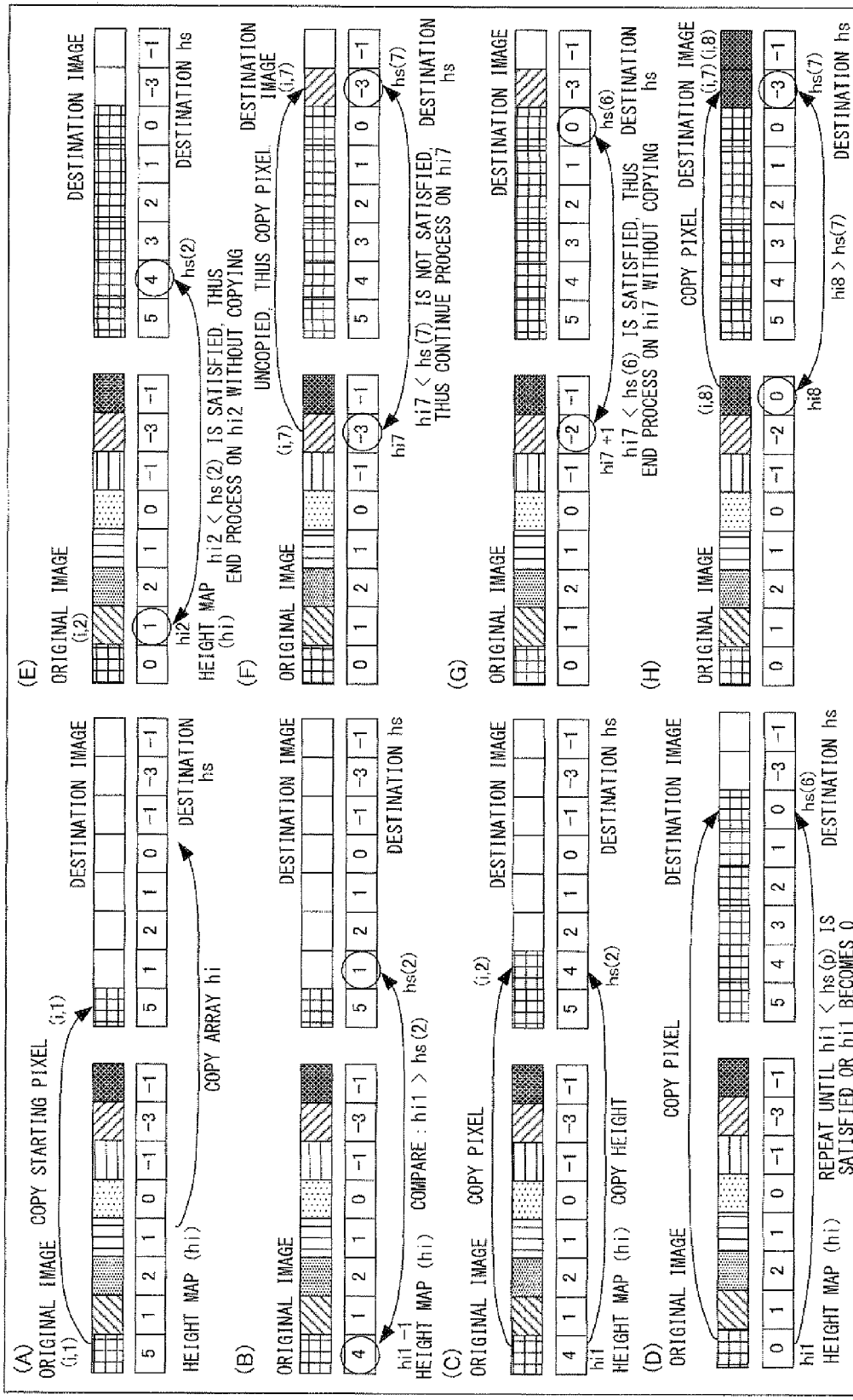
FIG. 9 is a diagram showing a flow of the image processing for generating a left-eye image.

Next, a flow of the image processing for altering the image displayed on the upper LCD 22 as described above will be described with reference to FIG. 9. FIG. 9 is a diagram showing the flow of the image processing for generating the left-eye image. FIG. 9 shows a flow of a process performed on each pixel (i, j) in a row i of the original image which corresponds to each element hij in the row i of the height map shown in FIG. 8.

First, a brief description of rules for generating the left-eye image is given, and a specific flow of the process is provided with reference to FIG. 9. The left-eye image is generated by each pixel being copied according to the following rules. Hereinafter, the original image may be referred to as a source image, and the generated left-eye image may be referred to as a destination image.

(1) In the case where the height hij is a positive value, the pixel (i, j) of the source image is copied in the rightward direction and, in the case where the height hij is a negative value, the pixel (i, j) of the source image is copied in the leftward direction.

(2) Copy the pixel (i, j) of the source image only in the case where the height of the source image is compared with the height of the pixel of the destination image and if the height of the pixel of the destination image is lower (smaller) than the height hij of the source image.

(3) In accordance with a pixel of the destination image being distanced away from the position of the pixel of the source image, decrement the height hij of the source image if the height hij of the pixel of the source image is a positive value, or increment the height hij of the source image if the height hij of the pixel of the source image is a negative value.

(4) If the pixel of the destination image is higher (larger in height) than the pixel of the source image, end the copy process (1) and the comparison process (2) on the pixel of the source image.

(5) Repeat the processes (1) to (4) until the height hij of the pixel (i, j) of the source image becomes 0, and when the height hij becomes 0, end the copy process (1) and the comparison process (2) on the pixel (i, j) of the source image.

(6) When the processes (1) to (5) on the pixel (i, j) of the source image are ended, perform the same processes on a pixel (i, j+1) of the source image, and perform the same processes on all pixels of the source image.

First, the height array hi in the row i of the height map is copied to a height array hs of the destination image, as shown in FIG. 9(A). In addition, a pixel (starting pixel) in the first column (in the row i) of the original image is copied to the pixel in the first column (in the row i) of the destination image. Thereafter, the processes are performed on the pixel in the row i and the first column of the original image, further on a pixel in the row i and a column m, thereby generating the row i of the destination image (the left-eye image).

Specifically, as shown in FIG. 9(B), a value of a height hi1 of the source image is updated by being decremented (the height hi1 is subtracted by 1 in terms of the 16 grades) (hi1=4). The second value (hs 2)=1) of the height array hs of the destination image is then compared with the height hi1 (=4) of the source image. As shown in FIG. 9(C), if the height hs (2) of the destination image is smaller (lower) than the height hi1 of the source image, the pixel (i, 1) of the source image is copied to the pixel (i, 2) of the destination image, and the height hi1 of the source image is also copied to hs (2) of the destination image. That is, in the example shown in FIG. 9(C), the height hs(2) (=1) of the destination image is lower than the height hi1 (=4) of the source image, thus the pixel (i, 2) of the left-eye image has the same pixel value as that of the pixel (i, 1) of the original image and the height hs(2) of the destination image is overwritten with the value of the height hi1 of the source image.

Next, the same processes are performed on the pixel (i, 1) of the source image. That is, the height hi1 (=4) of the source image is decremented to become the height hi1=3, the height hi1 (=3) is compared with the height hs(3) (=2) of the destination image, and the pixel (i, 1) of the source image is copied to the pixel (i, 3) of the destination image. Such comparison and copy processes on the pixel (i, 1) of the source image are repeated until the height hi1=0 is satisfied. Even in this case, the pixel (i, 1) of the source image is copied to the destination image only in the case where the height hs (p) (p=1 to 6) of the destination image is lower than the height hi1 of the source image. If the height hs (p) of the destination image is higher (larger) than the height hi1 of the source image, the comparison and copy processes on the pixel (i, 1) of the source image end. That is, the comparison and copy processes on the pixel (i, 1) of the source image are performed up to the original value of the height hi1+one time (=5+1). Such processes are performed on the pixel (i, 1) of the source image, and the result is as shown in FIG. 9(D).

In the example shown in FIG. 9(D), the height hs (p) of the destination image does not include a pixel having a height higher than the height hi1 of the source image, and therefore the pixel (i, 1) of the source image is copied to the pixel (i, 1) through to the pixel (i, 6) of the destination image.

Next, the same processes are performed on a pixel (i, 2) of the source image. That is, a height hi2 of the pixel (i, 2) of the source image is compared with the height hs(2) of the destination image, as shown in FIG. 9(E). In the case shown in FIG. 9(E), the height hi2=1 and the height hs(2)=4 and the height hs (2) of the destination image is higher than the height hi2 of the source image, and therefore the processes on the pixel (i, 2) of the source image end without the copy process being performed. Next, the same processes are performed on the pixel (i, 3) of the source image. However, since the height hs (3) (=3) of the destination image is higher than a height hi3 (=2) of the source image, the processes on the pixel (i, 3) of the source image end without the copy process being performed. The same processes are performed on the subsequent pixels of the source image. After the processes are performed on the pixel (i, 6) of the source image, the processes on the pixel (i, 7) of the source image, which is shown in FIG. 9(F), are performed.

As shown in FIG. 9(F), in the processes on the pixel (i, 7) of the source image, a height hi7 of the source image is first compared with the height hs (7) of the destination image in the same manner as described above. The height hi7 of the source image and the height hs (7) of the destination image are equal to each other and thus the height hs (7) of the destination image is not lower than the height hi7 of the source image. Therefore, the pixel (i, 7) of the source image is normally not copied to the pixel (i, 7) of the destination image. However, at a time point when the processes on the pixel (i, 7) of the source image are started, that is, at the time point shown in FIG. 9(E), nothing is copied to the pixel (i, 7) of the destination image. Therefore, the pixel (i, 7) of the source image is copied to the pixel (i, 7) of the destination image. That is, in the case where the height hi7 of the source image and the height hs (7) of the destination image are equal to each other and nothing is copied to the pixel (i, 7) of the destination image, the pixel (i, 7) of the source image is copied to the pixel (i, 7) of the destination image and the result is as shown in FIG. 9(F). As shown in FIG. 9(F), since the height hi7 of the source image is not 0 and the height hs (7) of the destination image is not higher than the height hi7 of the source image, the processes on the pixel (i, 7) of the source image are continued.

Next, as shown in FIG. 9(G), the height hi7 of the source image is incremented (added by 1), and the height hs (6) of the pixel (i, 6) of the destination image is compared with the height hi7 of the pixel (i, 7) of the source image. In the case where the height hi7 of the source image has a negative value as shown in FIG. 9(G), the height hi7 of the source image is incremented (hi7=−2), and the pixel (i, 6) of the destination image, which is to the left side of the pixel (i, 7) of the destination image, is compared with the pixel (i, 7) of the source image. In the case shown in FIG. 9(G), the height hs (6) of the pixel (i, 6) of the destination image is higher than the pixel (i, 7) of the source image and therefore, the processes on the pixel (i, 7) of the source image end.

Next, the processes on the pixel (i, 8) of the source image are performed. The same processes as that performed on the pixel (i, 7) of the source image are performed on the pixel (i, 8) of the source image. That is, since nothing is copied to the pixel (i, 8) of the destination image, the pixel (i, 8) of the source image is copied to the pixel (i, 8) of the destination image. Next, a height hi8 of the source image is incremented and compared with the height hs (7) of the pixel (i, 7) of the destination image (FIG. 9(H)). The height hs (7) of the destination image is lower than the height hi8 of the source image, and therefore the pixel (i, 8) of the source image is copied to the pixel (i, 7) of the destination image. Then, since the height hi8 of the source image is 0, the processes on the pixel (i, 8) of the source image end and the result is as shown in FIG. 9(H).

The row i of the left-eye image is generated as described above. The processes as described above are performed in all rows, thereby generating the left-eye image.

Although the right-eye image is generated in the same fashion as described above, the direction of the copy process is opposite to the direction for the case of the left-eye image. That is, in the case of the left-eye image, if the height of a pixel of the source image is a positive value, the pixel is copied in the rightward direction, and if the height of a pixel of the source image is a negative value, the pixel is copied in the leftward direction. On the other hand, for generating the right-eye image, if the height of a pixel of the source image is a positive value, the pixel is copied in the leftward direction and, if the height of a pixel of the source image is a negative value, the pixel is copied in the rightward direction. The reasons why the direction of the copy process for the left-eye image is thus different from that for the right-eye image are as described in the following.

Figure 10:
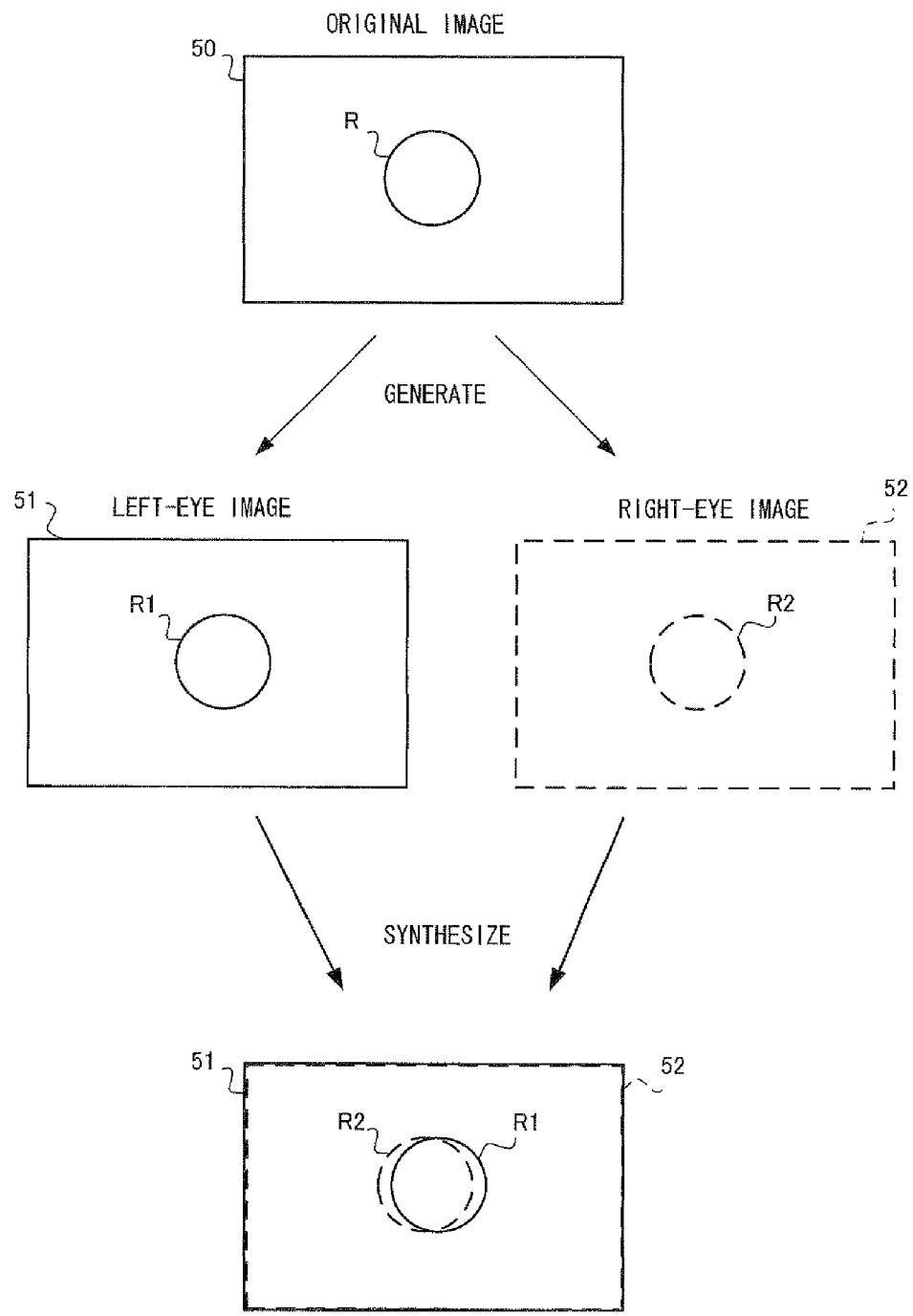
FIG. 10 is a diagram showing how a left-eye image 51 and a right-eye image 52 are generated from an original image 50 and synthesized with each other.

FIG. 10 is a diagram showing how a left-eye image 51 and a right-eye image 52 are generated from an original image 50 and synthesized with each other. As shown in FIG. 10, in order to provide a recognition for the user that as if the region R of the original image 50 is projecting out in the frontward direction of the screen, a region R1 of the left-eye image 51 which corresponds to the region R of the original image 50 and a region R2 of the right-eye image 52 which corresponds to the region R of the original image 50 need to be positioned on the right and left sides, respectively. When the left-eye image 51 and the right-eye image 52 are synthesized with each other and displayed on the upper LCD 22, the left-eye image 51 is viewed with the user's left eye and the right-eye image 52 is viewed by the user's right eye, through the parallax barrier in the upper LCD 22. The region R1 of the left-eye image 51 viewed with the user's left eye is displayed to the right side of the region R2 of the right-eye image 52 viewed with the user's right eye. That is, the parallax occurs at the region R of the original image 50, and the user feels as if the region R is positioned in the frontward direction of the screen. On contrary, in order to provide a recognition for the user that as if the region R of the original image 50 is positioned in the depth direction of the screen, the region R1 of the left-eye image 51 which corresponds to the region R of the original image 50 and the region R2 of the right-eye image 52 which corresponds to the region R of the original image 50 need to be positioned on the left and right sides, respectively. Therefore, by moving the pixels, of the left-eye and right-eye images, included in the region R of the original image to the right and left sides, respectively, allows the region R to projects out in the frontward direction of the screen. Further, by moving the pixels, of the left-eye and right-eye images, included in the region R of the original image to the left and right sides, respectively, allows the region R to move in the depth direction of the screen. The pixels of only one of the left-eye image and the right-eye image may be moved.

Furthermore, in the present embodiment, not only each pixel (i, j) of the original image is copied to the destination image in the horizontal direction, also the pixel (i, j) of the original image is copied in the horizontal direction to pixels of the destination image within a range in accordance with the value of the height hij of the pixel (i, j) of the original image. For example, in the example shown in FIG. 9, regarding the pixel (i, 1) of the source image, which has the height of 5, the pixel (i, 1) of the source image is copied to six consecutive pixels of the destination image in the horizontal direction (see FIG. 9(D)). The pixel is so copied within the range in accordance with the value of the height map of the source image, thereby obtaining an image in which the original image is naturally caused to transform in the frontward direction or depth direction of the screen.

(Detail of Image Processing)

Figure 11:
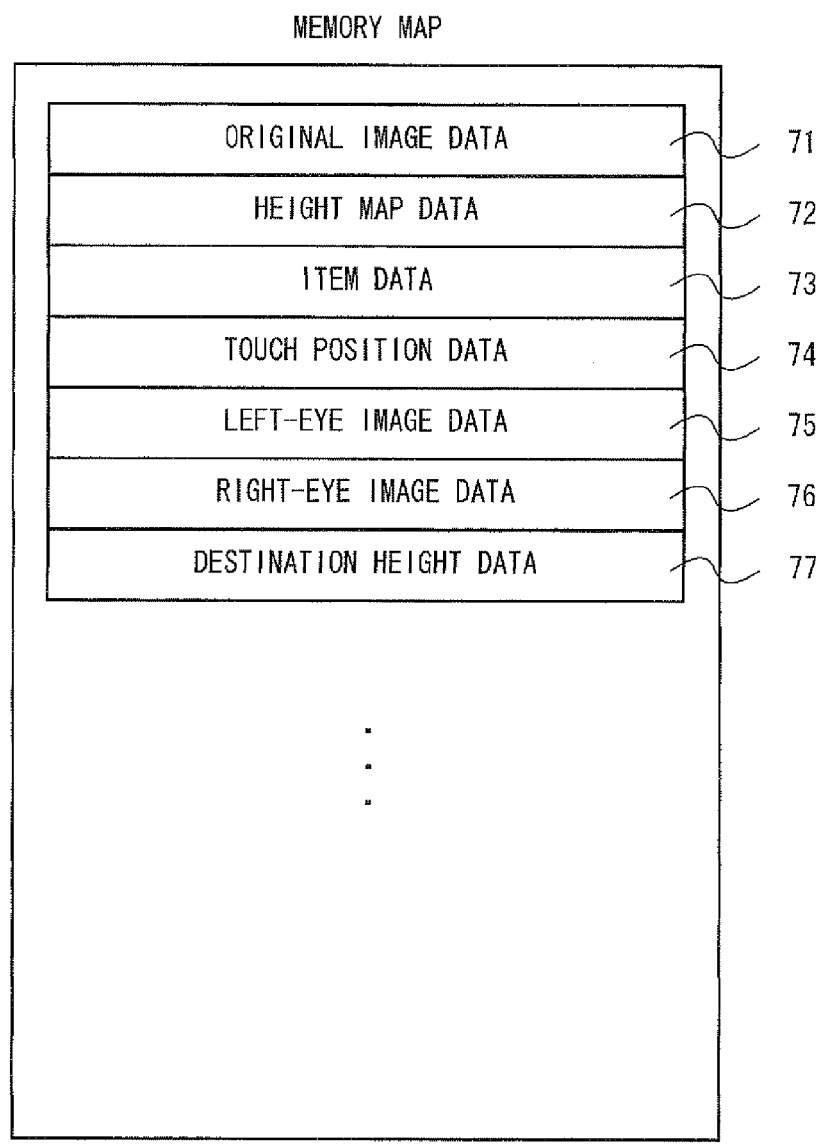
FIG. 11 is a diagram showing a memory map of a RAM of the game apparatus 10.

Next, the image processing according to the present embodiment will be described in detail with reference to FIG. 11 to FIG. 16. First, main data which are stored, in the image processing, in the main memory 32 and the VRAM 313 (hereinafter, these components may be collectively called RAM) will be described. FIG. 11 is a diagram illustrating a memory map of the RAM of the game apparatus 10. As shown in FIG. 11, the RAM stores therein original image data 71, height map data 72, item data 73, touch position data 74, left-eye image data 75, right-eye image data 76, destination height data 77, and the like. Other data stored in the RAM are a program for executing the image processing, data which indicates operation performed on each of the operation buttons 14A to E, G to H, and the analog stick 15.

The original image data 71 is data of the image initially displayed on the upper LCD 22. That is, the original image data 71 is data of the image before the image processing according to the present embodiment is performed. The original image data 71 may be previously provided, or may be image data taken by each imaging section (23 of 24) of the game apparatus 10.

The height map data 72 is data which indicates the above-described height map. Specifically, the height map data 72 is an n×m element two-dimensional array. An element in the row i and a column j of the array is represented by hij. Any value in the range of 0 to 255 is stored in each element of the height map. A value of each element hij of the height map in terms of the 16 grades (−8 to 7) is shown in a flowchart described below.

The item data 73 is data which indicates an item used for performing an operation on the original image and is data indicative of a currently selected item.

The touch position data 74 is data which represents a coordinate value of the touch position detected by the touch panel 13.

The left-eye image data 75 is data of the left-eye image displayed on the upper LCD 22. The right-eye image data 76 is data of the right-eye image displayed on the upper LCD 22.

The destination height data 77 is data which indicates the height of each pixel of the destination image (the left-eye image or the right-eye image). Specifically, the destination height data 77 is the height array hs, of the destination image, which is used for generating the left-eye image or the right-eye image, and is a one-dimensional array.

(Description of Main Flow)

Figure 12:
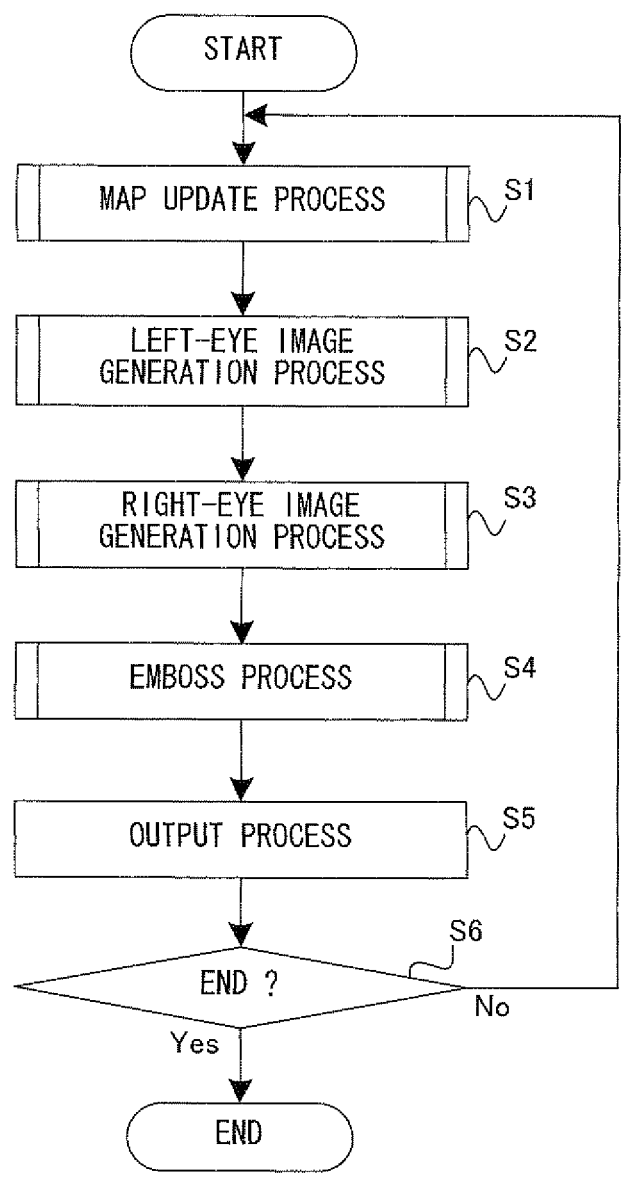
FIG. 12 is a main flowchart showing in detail the image processing according to the present embodiment.

Next, the image processing according to the present embodiment will be described in detail with reference to FIG. 12 to FIG. 16. FIG. 12 is a main flowchart showing in detail the image processing according to the present embodiment. When the game apparatus 10 is powered on, the information processing section 31 (CPU 311) of the game apparatus 10 executes a boot program stored in a ROM (not shown) to initialize each unit, such as the main memory 32. Next, the RAM (specifically, the main memory 32) reads the image processing program stored in a nonvolatile memory (such as the internal data storage memory 35; a computer-readable storage medium), and CPU 311 of the information processing section 31 starts executing the program. The information processing section 31 reads the image data of the original image initially displayed on the upper LCD 22 from a non-volatile memory (such as the internal data storage memory 35) and displays the original image on the upper LCD 22, as well as stores the image data in the RAM. The flowchart shown in FIG. 12 is a flowchart showing a process which is performed by the information processing section 31 (CPU 311 or GPU 312) after the above-described process is completed. The description of processes, which does not directly relate to the present invention, is omitted in FIG. 12. A processing loop of step S1 through step S6 shown in FIG. 12 is repeatedly executed for each frame (for example, 1/30 second or 1/60 second, which is referred to as frame time).

First, in step S1, the information processing section 31 executes a map update process. The map update process is a process in which the height map is updated in accordance with the user's operation. The map update process in step S1 will be described below in detail with reference to FIG. 13. After step S1, the information processing section 31 next executes a process of step S2.

In step S2, the information processing section 31 executes a left-eye image generation process. The left-eye image generation process is a process in which the left-eye image, which is viewed with the user's left eye, is generated from the original image. The left-eye image generation process in step S2 will be described below in detail with reference to FIG. 14. After step S2, the information processing section 31 next executes a process of step S3.

In step S3, the information processing section 31 executes a right-eye image generation process. The right-eye image generation process is a process in which the right-eye image, which is viewed with the user's right eye, is generated from the original image. The process of step S3 is the same process as that of step S2. The right-eye image generation process in step S3 will be described below in detail with reference to FIG. 15. After step S3, the information processing section 31 next executes a process of step S4.

In step S4, the information processing section 31 executes an emboss process. The emboss process is a process in which the generated left-eye and right-eye images are embossed. Here, the emboss process is a process to create shadow for an image to display the image more stereoscopically. The emboss process in step S4 will be described in detail with reference to FIG. 16. After step S4, the information processing section 31 next executes a process of step S5.

In step S5, the information processing section 31 executes an output process. Here, the output process is a process to output to the upper LCD 22 the left-eye image and the right-eye image which are generated by the above-described processes. That is, the information processing section 31 outputs to the upper LCD 22 the left-eye image on which the emboss process is performed in step S4 and the right-eye image on which the emboss process is performed in step S4. Specifically, the information processing section 31 alternately repeats outputting of pixel data of the right-eye image for one line in the vertical direction, and outputting of pixel data of the left-eye image for one line in the vertical direction, thereby reading the right-eye image and the left-eye image. Thus, an image to be displayed is divided into the images for the right eye and the images for the left eye each of which is a rectangle-shaped image having one line of pixels aligned in the vertical direction, and an image, in which the rectangle-shaped left-eye image which is obtained through the division, and the rectangle-shaped right-eye image which is obtained through the division are alternately aligned, is displayed on the screen of the upper LCD 22. The user views the images through the parallax barrier in the upper LCD 22 so that the right-eye image is viewed with the user's right eye and the left-eye image is viewed with the user's left eye. Thus, the stereoscopic image is displayed on the screen of the upper LCD 22. In step S5, as described below, portions having no shadow created are cropped out of the left-eye image and the right-eye image on which the emboss process have been performed, and the resulting left-eye and right-eye images are output to the upper LCD 22. Next, the information processing section 31 executes a process of step S6.

In step S6, the information processing section 31 determines whether to end the image processing. The information processing section 31 determines, for example, whether a predetermined operation has been performed by the user (for example, whether the select button 14J or the like has been pressed). If the determination result is negative, the information processing section 31 next executes the process of step S1. If the determination result is affirmative, the information processing section 31 ends the image processing shown in FIG. 12.

Next, each process described above will be described in detail.

(Map Update Process)

Figure 13:
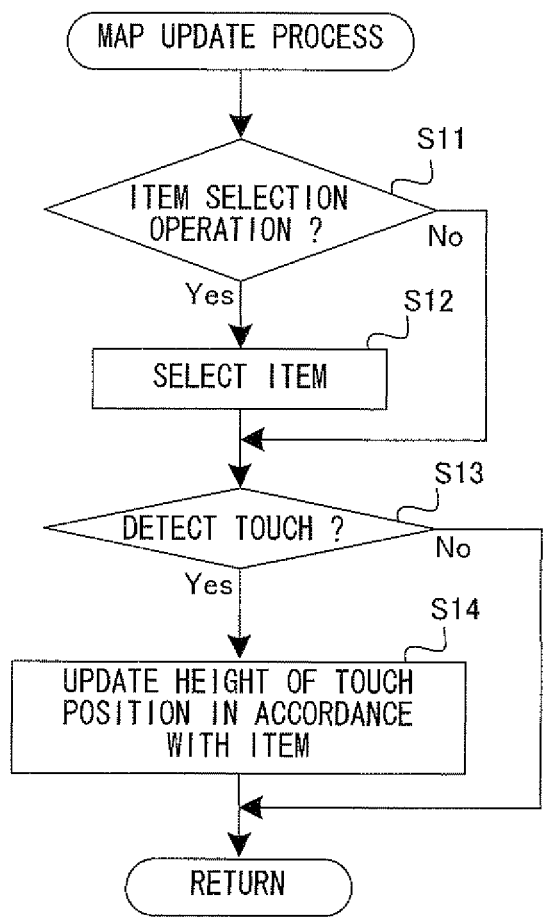
FIG. 13 is a flowchart showing in detail a map update process (step S1)

FIG. 13 is a flowchart showing in detail the map update process (step S1). First, in step S11, the information processing section 31 determines whether an item selection operation has been performed. If any operation on each predefined operation button used for the item selection operation is performed, the information processing section 31 determines that the item selection operation has been performed. For example, in the case where the select button 14J is pressed, an image used for the item selection is displayed on the lower LCD 12. Then, in the case where any of the plurality of items that are displayed is selected by the touch operation, the cross button 14A or the like, the information processing section 31 determines that the item selection operation has been performed. If the determination result is affirmative, the information processing section 31 next executes a process of step S12. On the other hand, if the determination result is negative, the information processing section 31 next executes a process of step S13. The item selection may be performed by an operation on the cross button 14A, any of the operation buttons 14C to 14D, or the analog stick 15.

In step S12, the information processing section 31 selects an item and stores the item in the RAM as the item data 73 indicative of the currently selected item. Next, the information processing section 31 executes a process of step S13.

In step S13, the information processing section 31 determines whether the touch operation on the touch panel 13 has been detected. If the touch operation on the touch panel 13 is detected, the information processing section 31 stores the detected touch position in the RAM as the touch position data 74. If the determination result is affiimative, the information processing section 31 next executes a process of step S14. On the other hand, if the determination result is negative, the information processing section 31 ends the map update process and executes the process of step S2 shown in FIG. 12.

In step S14, the information processing section 31 updates the height map, based on the currently selected item and the touch position detected in step S13. Specifically, the information processing section 31 refers to the RAM, and updates the element hij of the height map, which corresponds to the touch position, in accordance with the currently selected item. For example, in the case where the pen item, which is used to cause the image to project, is selected, the information processing section 31 increases, by a predetermined value (for example, 1 in terms of the 16 grades), the height hij of the pixel (i, j), of the original image, which corresponds to the detected touch position. Further, for example, in the case where the stamp item, which is used to recess the image, is selected, the information processing section 31 decreases, by a predetermined value (for example, 1 in terms of the 16 grades), the heights of the plurality of pixels within a predetermined region based on the detected touch position. As described above, the information processing section 31 updates the height map data 72 stored in the RAM, in accordance with the selected item and the touch position. Next, the information processing section 31 ends the map update process and executes the process of step S2 shown in FIG. 12.

(Left-Eye Image Generation Process)

Figure 14:
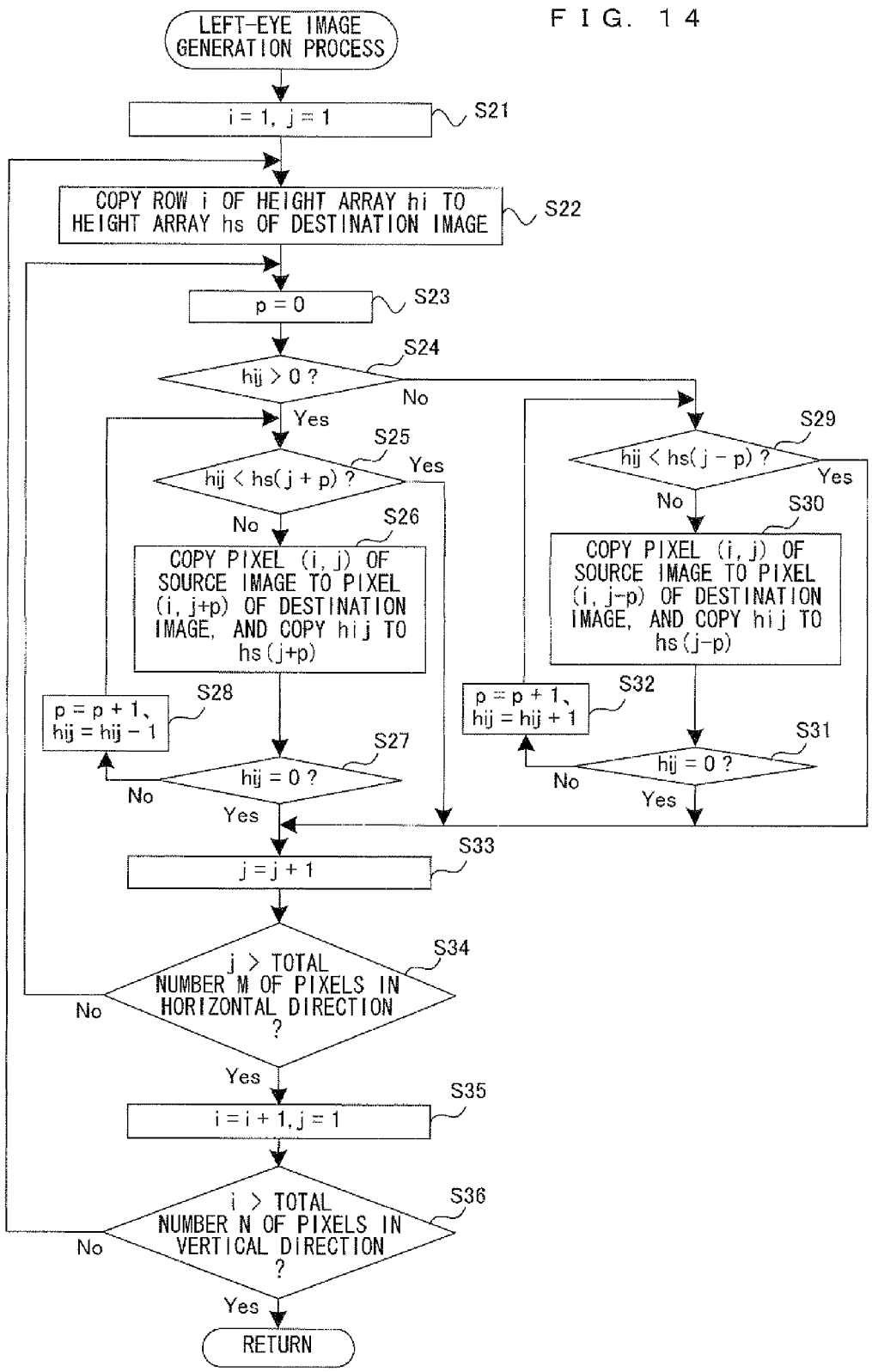
FIG. 14 is a flowchart showing in detail a left-eye image generation process (step S2)

Next, the left-eye image generation process in step S2 will be described. FIG. 14 is a flowchart showing in detail the left-eye image generation process (step S2). First, in step S21, the information processing section 31 sets 1 to a variable i and a variable j. The variable i changes in the range of 1 to n (n is the total number of pixels of the original image in the vertical direction), and the variable j changes in the range of 1 to m (m is the total number of pixels of the original image in the horizontal direction). Next, the information processing section 31 executes a process of step S22.

In step S22, the information processing section 31 refers to the height map data 72 stored in the RAM to copy the height array hi in the row i of the height map, which is updated in step S1, to the height array hs of the destination image. Here, the height array hi is an array having m elements hi1 through him in the row i of the updated height map. The height array hs is a buffer used for generating the row i of the left-eye image. The process of step S22 is a process to copy the height map hi to the destination hs, which is shown in FIG. 9(A). Next, the information processing section 31 executes a process of step S23.

In step S23, the information processing section 31 sets 0 to a variable p. Here, the variable p is a counter for counting the number of times to copy each pixel of the original image. The processes of step S23 to step S34 are repeatedly performed, and thereby the comparison and copy processes are performed on all pixels (1 to m) in the row i of the original image. Next, the information processing section 31 executes a process of step S24.

In step S24, the information processing section 31 determines whether the element hij of the height map is greater than 0. That is, the information processing section 31 considers the element hij of the height map in terms of the 16 grades and determines whether the value of the element hij in terms of the 16 grades is greater than 0. In the following description with reference to FIG. 14 and FIG. 15, processes, in which each element of the height map is considered in terms of the 16 grades, are described. If the element hij is greater than 0, the information processing section 31 next executes a process of step S25. On the other hand, if the element hij is equal to or less than 0, the information processing section 31 next executes a process of step S29.

In step S25, the information processing section 31 determines whether the height hij of the source image is smaller than the height hs (j+p) of the destination image. The process here determines whether the pixel (i, j+p) of the destination image is higher than the pixel (i, j) of the source image (see FIG. 9(B)). hs (j+p) indicates the element j+p of the height array hs of the destination image. In step S25, the height hij of the pixel (i, j) of the source image is a positive value, and therefore the pixel (i, j) of the source image is compared and copied in the rightward direction (see FIG. 9(B) to FIG. 9(D)). If the determination result is negative, the information processing section 31 next executes a process of step S26. On the other hand, if the determination result is affirmative, the information processing section 31 next executes a process of step S33.

In step S26, the information processing section 31 copies the pixel (i, j) of the source image to the pixel (i, j+p) of the destination image and copies the height hij of the source image to the height hs (j+p) of the destination image. The process of step S26 is executed in the case where a condition hij>hs (j+p) or hij=hs (j+p) is satisfied. If the pixel (i, j+p) of the destination image is lower than the pixel (i, j) of the source image, that is, the condition hij>hs (j+p) is satisfied, the information processing section 31 copies the hij of the source image to the hs (j+p) of the destination image, as well as copies the pixel (i, j) of the source image to the pixel (i, j+p) of the destination image (see FIG. 9(C)). In step S26, if the hij of the source image and the hs (j+p) of the destination image are equal to each other and if nothing is copied to the pixel (i, j+p) of the destination image, the information processing section 31 copies the pixel (i, j) of the source image to the pixel (i, j+p) of the destination image. On the other hand, in step S26, even if the condition hij=hs (j+p) is satisfied, if a pixel is already copied to the pixel (i, j+p) of the destination image, the pixel (i, j) of the source image is not copied to the pixel (i, j+p) of the destination image (see FIG. 9(F)). The information processing section 31 next executes a process of step S27.

In step S27, the information processing section 31 determines whether the hij of the source image is equal to 0. That is, the information processing section 31 determines whether the height hij of the pixel of the source image has become 0. If the determination result is negative, the information processing section 31 next executes a process of step S28. On the other hand, if the determination result is affirmative, the information processing section 31 next executes a process of step S33.

In step S28, the information processing section 31 adds 1 to the variable p and decrements the height hij of the source image. In step S28, the height hij of the source image is a positive value, and therefore the information processing section 31 decrements the height hij of the source image. Next, the information processing section 31 executes again the process of step S25, thereby comparing the height hij of the source image with the height of the next pixel (a pixel on the right side) of the destination image (see FIG. 9(C)).

On the other hand, if the determination result in step S24 is negative, the information processing section 31 executes a process of step S29. In step S29, the information processing section 31 determines whether the height hij of the source image is smaller than the height hs (j−p) of the destination image. The process of step S29 is the same process as that of step S25, which determines whether the pixel (i, j−p) of the destination image is higher than the pixel (i, j) of the source image (see FIG. 9(G)). hs (j−p) indicates the element j−p of the height array hs of the destination image. In step S29, the height hij of the pixel (i, j) of the source image is a negative value, and therefore the pixel (i, j) of the source image is compared and copied in the leftward direction (see FIG. 9(G) to FIG. 9(H)). If the determination result is negative, the information processing section 31 next executes a process of step S30. On the other hand, if the determination result is affirmative, the information processing section 31 next executes a process of step S33.

In step S30, the information processing section 31 copies the height hij of the source image to the height hs (j−p) of the destination image, as well as copies the pixel (i, j) of the source image to the pixel (i, j−p) of the destination image. The process of step S30 is the same process as that of step S26. Specifically, the process of step S30 is executed if a condition hij>hs p), or hij=hs (j−p) is satisfied. If the pixel (i, j−p) of the destination image is lower than the pixel (i, j) of the source image, that is, the condition hij>hs (j−p) is satisfied, the information processing section 31 copies the hij of the source image to the hs (j−p) of the destination image, as well as copies the pixel (i, j) of the source image to the pixel (i, j−p) of the destination image, and (see FIG. 9(H)). In step S30, if the hij of the source image and the hs (j−p) of the destination image are equal to each other and if nothing is copied to the pixel (i, j−p) of the destination image, the information processing section 31 copies the pixel (i, j) of the source image to the pixel (i, j−p) of the destination image. On the other hand, in step S30, even if the condition hij=hs (j−p) is satisfied, if a pixel is already copied to the pixel (i, j−p) of the destination image, the pixel (i, j) of the source image is not copied to the pixel (i, j−p) of the destination image. The information processing section 31 next executes a process of step S31.

In step S31, the information processing section 31 determines whether the hij of the source image is equal to 0. That is, the information processing section 31 determines whether the height hij of the pixel of the source image has become 0. If the determination result is negative, the information processing section 31 next executes a process of step S32. On the other hand, if the determination result is affirmative, the information processing section 31 next executes a process of step S33.

In step S32, the information processing section 31 adds 1 to the variable p and increments the height hij of the source image. In step S32, the height hij of the source image is a negative value, and therefore the information processing section 31 increments the height hij of the source image. Next, the information processing section 31 executes again the process of step S29, thereby comparing the hij of the source image with the next pixel (a pixel on the left side) of the destination image (see FIG. 9(G)).

On the other hand, the information processing section 31 adds 1 to the variable j in step S33. By the variable j being incremented, the processes on the pixel in the row i and the column j of the source image end and the processes on the pixel in a column j+1 of the source image are executed. Next, the information processing section 31 executes a process of step S34.

In step S34, the information processing section 31 determines whether the variable j is greater than the total number in of pixels in the horizontal direction. If the determination result is affirmative, the information processing section 31 next executes a process of step S35. On the other hand, if the determination result is negative, the information processing section 31 executes again the process of step S23 and executes the comparison and copy processes on the pixel in the row i and the next column (j+1) of the source image.

In step S35, the information processing section 31 adds 1 to the variable i and sets 1 to the variable j. Since the variable i is incremented and the variable j is initialized, the processes on pixels in a row i+1 of the source image, that is the next row of the row i, are performed. Next, the information processing section 31 executes a process of step S36.

In step S36, the information processing section 31 determines whether the variable i is greater than the total number n of pixels in the vertical direction. If the determination result is negative, the information processing section 31 executes again the process of step S22 and executes the comparison and copy processes on each pixel in the row i+1. On the other hand, if the determination result is affirmative, the information processing section 31 ends the left-eye image generation process shown in FIG. 14 and executes the process of step S3 shown in FIG. 12.

(Right-Eye Image Generation Process)

Figure 15:
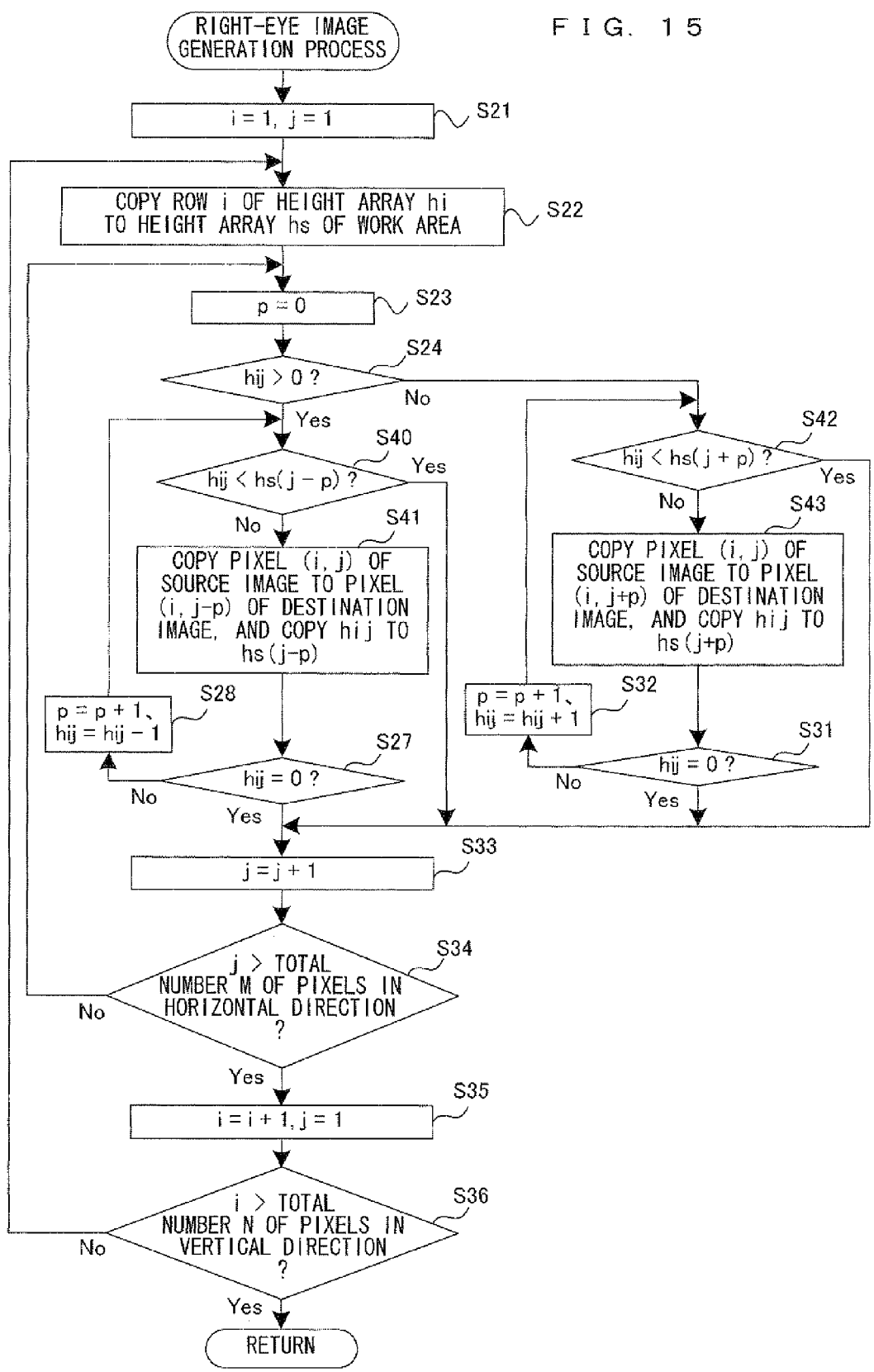
FIG. 15 is a flowchart showing in detail a right-eye image generation process (step S3)

Next, the right-eye image generation process in step S3 will be described. In the right-eye image generation process, the right-eye image is generated by using the height map updated in the process of step S1 and the original image. That is, during the course of the left-eye image generation process in step S2, each element hij of the height map is updated (incremented or decremented) as described above. However, the height map itself is stored in the main memory 32, without actually being updated during the course of the left-eye image generation process. In the right-eye image generation process in step S3, the height map that is stored in the main memory 32 (that is generated by the process of step S1) is used. FIG. 15 is a flowchart showing in detail the right-eye image generation process (step S3). Although the right-eye image generation process is the same as the above-described left-eye image generation process, the direction of the copy process in the right-eye image generation process is different from that in the left-eye image generation process. The same step numbers are used in FIG. 15 for the same process as that shown in FIG. 14 and the description thereof is omitted. In the process shown in FIG. 15, step S25 and step S26 shown in FIG. 14 are replaced by step S40 and step S41, respectively, and step S29 and step S30 in FIG. 14 are replaced by step S42 and step S43, respectively.

In step S40, the information processing section 31 determines whether the height hij of the source image is smaller than the height hs (j−p) of the destination image. The process here determines whether the pixel (i, j−p) of the destination image is higher than the pixel (i, j) of the source image. In step S40, an image to be generated is the right-eye image and the height hij of the pixel (i, j) of the source image is a positive value, and therefore the pixel (i, j) of the source image is compared and copied in the leftward direction. If the determination result is negative, the information processing section 31 next executes a process of step S41. On the other hand, if the determination result is affirmative, the information processing section 31 next executes a process of step S33.

In step S41, the information processing section 31 copies the height hij of the source image to the height hs (j−p) of the destination image, as well as copies the pixel (i, j) of the source image to the pixel (i, j−p) of the destination image. In step S41, a direction of the copy process is opposite to the direction in step S26. That is, the variable p is a positive integer, and thus, if, for example, p=1, the pixel (i, j) of the source image is copied to the pixel (i, j−1) of the destination image in step S41. That is, the pixel (i, j) of the source image is copied to the pixel (i, j−1), which is left-adjacent to the pixel (i, j), of the destination image. On the other hand, if p=1, the pixel (i, j) of the source image is copied to the pixel (i, j+1), which is right-adjacent to the pixel (i, j), of the destination image in step S26. After step S41, the information processing section 31 executes a process of step S27.

On the other hand, in step S42, the information processing section 31 determines whether the height hij of the source image is smaller than the height hs (j+p) of the destination image. The process in step S42 determines whether the pixel (i, j+p) of the destination image is higher that the pixel (i, j) of the source image. In step S42, an image to be generated is the right-eye image and the height hij of the pixel (i, j) of the source image is a negative value, and therefore the pixel (i, j) of the source image is compared and copied in the rightward direction. If the determination result is negative, the information processing section 31 next executes a process of step S43. On the other hand, if the determination result is affirmative, the information processing section 31 next executes a process of step S33.

In step S43, the information processing section 31 copies the height hij of the source image to the height hs (j+p) of the destination image, as well as copies the pixel (i, j) of the source image to the pixel (i, j+p) of the destination image. In step S43, the direction of the copy process is opposite to that in step S30. Since the variable p is a positive integer, if, for example p=1, the pixel (i, j) of the source image is copied to the pixel (i, j+1) of the destination image in step S43. That is, the pixel (i, j) of the source image is copied to the pixel (i, j+1), which is right-adjacent to the pixel (i, j), of the destination image. After step S43, the information processing section 31 executes a process of step S31.

(Emboss Process)

Figure 16:
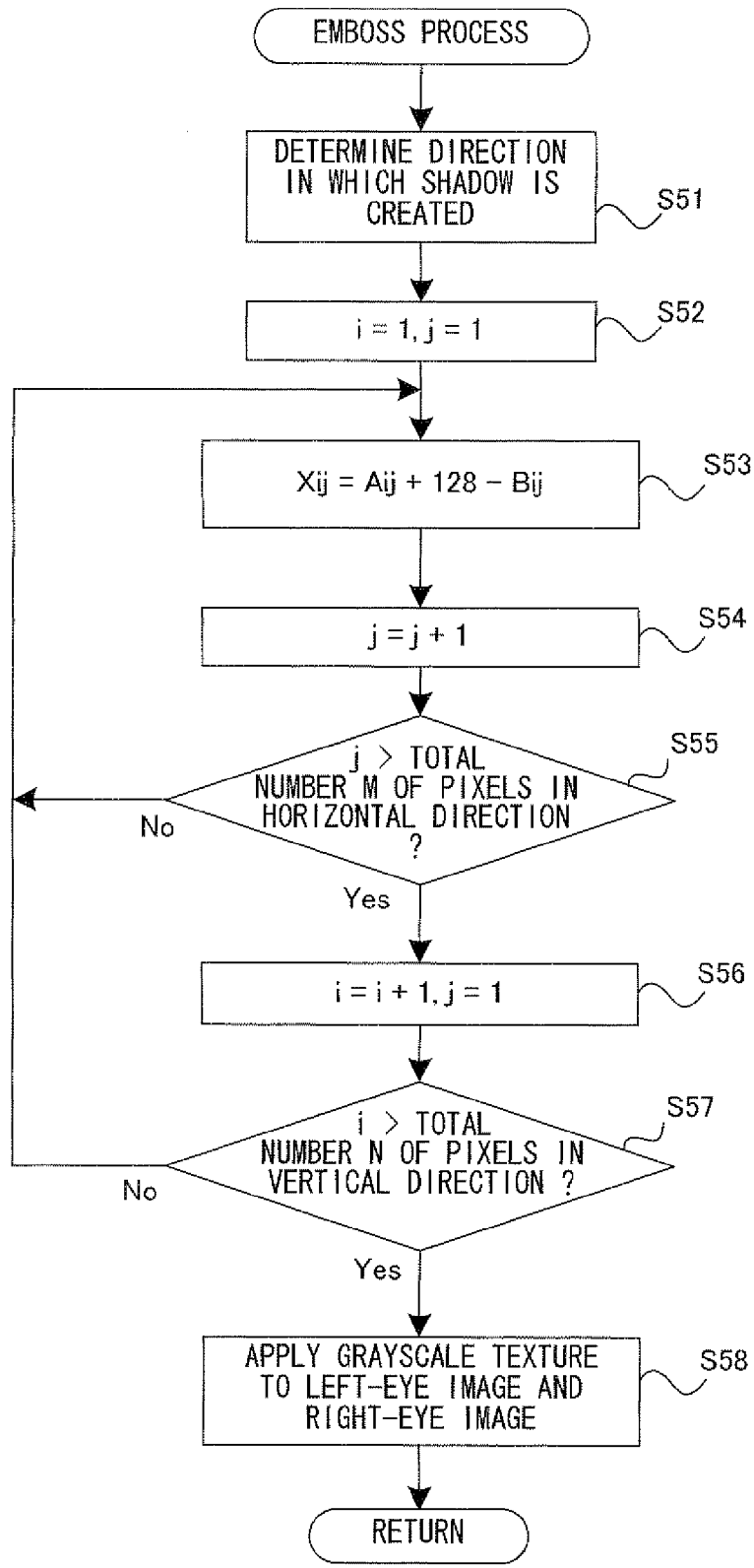
FIG. 16 is a flowchart showing in detail an emboss process (step S4)

Next, the emboss process in step S4 will be described. In the emboss process in step S4, the emboss process is performed using the height map generated in step S1. Specifically, in the emboss process in step S4, the height map generated in step S1 is used to generate a grayscale texture image and the generated texture image is pasted to the left-eye image and the right-eye image. This creates shadow for the left-eye image and the right-eye image, thereby generating an image having more stereoscopic effects. FIG. 16 is a flowchart showing in detail the emboss process (step S4).

First, in step S51, the information processing section 31 determines a direction in which the shadow is created. The direction in which the shadow is created is a direction of light emitted from a virtual light source and a direction of a shadow created when the light from the virtual light source is emitted on the stereoscopic image displayed on the upper LCD 22. In the present embodiment, the direction in which the shadow is created is a predetermined direction and is, for example, a direction extending from the lower left of the screen toward the upper left of the screen. Next, the information processing section 31 next executes a process of step S52.

In step S52, the information processing section 31 sets 1 to the variable i and the variable j. The variable i changes in the range of 1 to n (n is the total number of pixels of the original image in the vertical direction), and the variable j changes in the range of 1 to m (m is the total number of pixels of the original image in the horizontal direction). Next, the information processing section 31 executes a process of step S53.

In step S53, the information processing section 31 uses the height map generated by the process of step S1 to calculate a grayscale value of each pixel of the texture image to paste. Specifically, the information processing section 31 performs the following calculation:

$$Xij = Aij + 128 - B \quad (1)$$

where, Aij is a value of the height in the row i and the column j of the height map and any value in the range of 0 to 255. B is a value of an element of the height map which is present in the direction determined in step S51 in which the shadow is created and which extends from Aij. B is any value in the range of 0 to 255. B is, for example, a value of the element of the height map two pixels away from Aij in the rightward direction and another two pixels away therefrom in the upward direction. FIG. 17 is a diagram illustrating the calculation of the grayscale value in the emboss process. That is, as shown in FIG. 17, B is an element present diagonally upwardly right to the element Aij of the height map, and if, for example, i=4 and j=4, B is an element h26 of the height map two pixels away from A44 in the rightward direction and another two pixels away therefrom in the upward direction. Although, in FIG. 17, a value of each element of the height map is represented in terms of the 16 grades (−8 to 7), the value of each element is actually in the range of 0 to 255. If there is no pixel corresponding to B (for example, X11), the information processing section 31 make a setting as, for example, Xij=0. A portion in which there is no pixel corresponding to B is not actually displayed. Next, the information processing section 31 executes a process of step S54.

In step S54, the information processing section 31 increments the variable j (adds 1 to the variable j). Next, the information processing section 31 executes a process of step S55.

In step S55, the information processing section 31 determines whether the variable j is greater than the total number m of pixels in the horizontal direction. If the determination result is affirmative, the information processing section 31 next executes a process of step S56. On the other hand, if the determination result is negative, the information processing section 31 executes again the process of step S53. The processes of step S53 to step S55 are repeatedly performed, and thereby the processes on each element in the row i of the height map are performed.

In step S56, the information processing section 31 increments the variable i (adds 1 to the variable i) and sets 1 to the variable j. Next, the information processing section 31 executes a process of step S57.

In step S57, the information processing section 31 determines whether the variable i is greater than the total number n of pixels in the vertical direction. If the determination result is affirmative, the information processing section 31 next executes a process of step S58. On the other hand, if the determination result is negative, the information processing section 31 executes again the process of step S53. The processes of step S53 to step S57 are repeatedly performed, and thereby the grayscale value of the grayscale texture to be mapped (applied) to the left-eye image and the right-eye image is calculated.

In step S58, the information processing section 31 applies the grayscale texture to the left-eye image and the right-eye image, which are generated in step S2 and step S3, respectively. Specifically, the information processing section 31 maps to the left-eye image and the right-eye image the grayscale image (the texture image) generated by the processes of step S51 to step S57. Here, the texture image is an image used for texture mapping and has, as pixels thereof, the above-described element Xij (i=1 to n, j=1 to m). In step S58, the texture image is applied to the left-eye image and the right-eye image so that each pixel of the texture image corresponds to each pixel of the left-eye and right-eye images. That is, the texture image is applied to the left-eye image so that the pixel Xij in the row i and the column j of the texture image is made coincide with the pixel in the row i and the column j of the left-eye image. The grayscale texture is applied to the left-eye image and right-eye image, thereby creating the shadow in the left-eye image and the right-eye image. In the case where the texture image is applied to the left-eye image and the right-eye image so that each pixel of the texture image corresponds to each pixel of the left-eye and right-eye images, there occurs portions in the left-eye image and the right-eye image where no shadow is created. The portions where no shadow is created are portions where there is no pixel corresponding to B in Equation (1) in step S53 and where the setting, for example, Xij=0 is made.

This displays portions having high heights (portions, which is rises in the frontward direction of the screen of the upper LCD 22, of the image displayed on the upper LCD 22 as the stereoscopic image) brightly and portions having low heights (portions, which recesses in the depth direction of the screen of the upper LCD 22, of the image displayed on the upper LCD 22 as the stereoscopic image) darkly. This realizes the displayed image to have more stereoscopic effects. After the process of step S58, the information processing section 31 ends the emboss process, and executes the output process of step S5 shown in FIG. 12.

In the output process of step S5, portions having no shadow created are cropped out of the left-eye image and the right-eye image on which the emboss process are performed, and the resulting left-eye and right-eye images are output to the upper LCD 22, as described above. Therefore, the image displayed on the upper LCD 22 is an image in which portions of the original image (for example, upper end and right end portions of the original image in the case where the direction in which the shadow is created is a direction extending from the lower left toward the upper right) are cropped out.

As described above, in the present embodiment, the pixel of the original image is copied to pixels of the destination image in the horizontal direction within a range in accordance with the value of the height of the pixel of the original image. For example, if the height of the pixel (i, 1) of the original image is 5, the pixel (i, 1) of the original image is copied to pixels of the destination image in the horizontal direction within a range from the pixel (i, 1) through to the pixel (i, 6) of the destination image which is five pixels. Then, the left-eye image and right-eye image, which are thus generated, are displayed on the upper LCD 22, thereby displaying the stereoscopic image.

That is, in the present embodiment, image data (RGB value) of a pixel (i, j) of the original image is copied to pixels of the destination image within the range from a pixel (i, j) of the destination image which corresponds to the pixel (i, j) of the original image through to a pixel (i, j+hij) (or, (i, j−hij)) of the destination image in accordance with the height hij of the pixel (i, j) of the original image. Then, the same copy process is performed on each pixel of the original image, and thereby the left-eye image and the right-eye image are generated.

More specifically, in the present embodiment, the following processes are performed on a pixel (i, j) of the original image.

(1) If a height value hij of the pixel (i, j) of the original image is a positive value (hij>0) (if the height of the pixel indicates a position in the frontward direction of the screen):

For generating the left-eye image, copy the pixel (i, j) of the original image to pixels of the destination image in the rightward direction within the range from the pixel (i, j) of the destination image corresponding to the pixel (i, j) of the original image through to the pixel (i, j+hij) of the destination image in accordance with the height hij of the original image; and For generating the right-eye image, copy the pixel (i, j) of the original image to pixels of the destination image in the leftward direction within the range from the pixel (i, j) of the destination image corresponding to the pixel (i, j) of the original image through to the pixel (i, j−hij) of the destination image in accordance with the height hij of the original image.

(2) If the height value hij of the pixel (i, j) of the original image is a negative value (hij<0) (if the height of the pixel indicates a position in the depth direction of the screen):

For generating the left-eye image, copy the pixel (i, j) of the original image to pixels of the destination image in the leftward direction within the range from the pixel (i, j) of the destination image corresponding to the pixel (i, j) of the original image through to the pixel (i, j−hij) of the destination image in accordance with the height hij of the original image; and For generating the right-eye image, copy the pixel (i, j) of the original image to pixels of the destination image in the rightward direction within the range from the pixel (i, j) of the destination image corresponding to the pixel (i, j) of the original image through to the pixel (i, j+hij) of the destination image in accordance with the height hij of the original image.

(3) When the pixel (i, j) of the original image is copied to the pixel (i, j+p) of the destination image in the processes (1) and (2), compare the height of the pixel of the original image with the height of the pixel of the destination image, and perform the copy process only when the pixel of the original image is higher than the pixel of the destination image.

(4) At the comparison process (3), change the height hij of the pixel (i, j) of the original image in accordance with the pixel (i, j+p) of the destination image being distanced away from the position of the pixel (1, j) of the original image, so that the height of the pixel (i, j) of the original image becomes close to the position of the screen, i.e., 0.

(5) If the pixel of the original image is lower than the pixel of the destination image, end the processes on the pixel of the original image and perform the processes (1) to (4) on the next pixel of the original image.

As described above, each pixel of the source image is copied to pixels of the destination image in the horizontal direction within the range from a pixel of the destination image corresponding to the pixel of the source image through to a pixel of the destination image in accordance with the value of the height of the pixel of the source image (from a position of the pixel of the destination image corresponding to the pixel of the source image up to pixels of the destination image as many as the value of the height of the pixel of the source image), and therefore more realistic stereoscopic image can be displayed. That is, when the user sees an object (stereoscopic object) present in the real space, a portion X of the object present in a viewing direction of the user (depth direction) is hidden by a portion Y of the object present in the frontward direction of the user, and therefore may not be seen by the user's eyes. If a portion that should be unviewable to the user is viewable, the image ends up giving the user a sense of discomfort. In the present embodiment, each pixel of the source image is copied to pixels of the destination image in the horizontal direction within the range through to the pixel of the destination image in accordance with the value of the height of the pixel of the source image, and thus the user is not shown the portion that should be unviewable to the user. Therefore, more natural stereoscopically visible image can be displayed. That is, in the present embodiment, even in the case where stereoscopically displaying a state in which a portion on the screen is curved gradually raising or recessing in the direction perpendicular to the screen or a state in which a portion on the screen projects or recesses as if protruding abruptly, such state can be naturally displayed without giving the user the sense of discomfort. Specifically, a portion designated by the user can be caused to project out from or recess into the screen. For example, if the user designates a subregion of an image (picture) taken by the outer imaging section 23 or the inner imaging section 24 or a subregion of a predetermined image, the designated subregion can be caused to project without effect on the other regions.

FIG. 18 is a conceptual diagram showing how each pixel of the left-eye image generated by the processes in the present embodiment is viewed. In FIG. 18, pixels 81 to 83 are represented by pillar shapes and the height of each pillar representing each pixel indicates the height of the pixel. As shown in FIG. 18, when the pixel 81 is seen from the position of the left eye, the left eye can see the pixel 81, but cannot see the pixel 82 because the pixel 82 is hidden by the pixel 81. In the processes of the present embodiment, the pixel 81 is copied to pixels of the destination image in the rightward direction within a range in accordance with the height of the pixel 81. Therefore, the pixel 82 is overwritten with the pixel 81 and thus not displayed. This corresponds with the view in the real space. That is, when seen from the position of the left eye, a portion of an object, which corresponds to the pixel 82, cannot be seen in the real space because of a portion of an object which corresponds to the pixel 81. Therefore, the stereoscopic image using the left-eye image and the right-eye image which are generated by the processes of the present embodiment appears more natural when displayed.

Further, in the present embodiment, in the case where, for example, the height of a pixel of the source image is a positive value and the left-eye image is generated, the height of the pixel of the source image is decremented (step S28) as the pixel is copied in the rightward direction. Also, for example, in the case where the height of the pixel of the source image is a negative value and the left-eye image is generated, the height of the pixel of the source image is incremented as the pixel is copied in the leftward direction (step S28). That is, in accordance with the pixel of the destination image being distanced away from the position of the pixel of the original image, the height of the pixel of the original image is changed so that the height of the pixel of the original image becomes close to the position of the screen, i.e., 0. This allows displaying more natural stereoscopic image.

That is, in the case where the height of the pixel of the original image is not incremented or decremented in accordance with the pixel of the destination image being distanced away in the horizontal direction from the position of the pixel of the original image, a plurality of pixels (five pixels) which is in the rightward direction of a relatively high pixel (having the height of 5, for example) are undesirably overwritten with the high pixel, for example. Because of this, the effect of the relatively high pixel is strong and therefore the generated left and the right images ends up being images as if portions of the high pixels expand in the horizontal direction. Therefore, the effect of the high pixels is reduced by incrementing or decrementing the height of the pixel of the original image in accordance with the pixel of the destination image being distanced away in the horizontal direction from the position of the pixel of the original image, and thus more natural stereoscopic image can be displayed. FIG. 18 conceptually illustrates this. As shown in FIG. 18, in the case where, for example, the left-eye image is generated, although the pixel 82 is hidden by the pixel 81 from the position of the left eye, the pixel 83 is not hidden. That is, the pixel 82 is unviewable from the position of the left eye because the pixel 81 is higher than the pixel 82. However, the pixel 83 is viewable even if the pixel 82 and the pixel 83 have the same height because the pixel 83 is distanced away from the pixel 81. Correspondingly, in the process of the present embodiment, the height of the pixel of the original image is changed (the height value is incremented or decremented) in accordance with the pixel of the destination image being distanced away from the position of the pixel of the original image so that the height of the pixel of the original image becomes close to the position of the screen, i.e., 0. Therefore, more natural stereoscopic image can be displayed in the present embodiment.

Further, the emboss process is performed on the generated left-eye and right-eye images as described above, and thereby an image having more stereoscopic effects can be generated. That is, since the shadow is created by performing the emboss process on each image, the image has more stereoscopic effects due to the effect of the shadow.

Further, since the generated height map is directly used for the emboss process, the process can be simplified. That is, the grayscale value is stored in each element of the height map, and therefore the height map can be utilized as it is when the emboss process is performed. Since, even in the real space, high portions encounter more light and the shadow is created for low portions, the height map having stored therein the height of each pixel can be used as it is for the emboss process.

As described above, in the present embodiment, an image in which the original image is naturally transformed in the direction perpendicular to the screen can be obtained by using the height map, without transforming the original image itself. Since the original image need not be transformed, if, for example, an image taken of the three-dimensional virtual object is displayed as the original image, there is no need to actually transform the object and take images of the object by the virtual stereo camera. When transforming the three-dimensional object, a shape of a three-dimensional model representing the three-dimensional object needs to be altered, and which requires a complex calculation. In the present embodiment, however, the three-dimensional object can be transformed by altering an image once taken, without altering the three-dimensional model itself.

(Modification)

In the present embodiment, the left-eye image and the right-eye image are generated by performing the processes on the original image pixel by pixel. In another embodiment, the left-eye image and the right-eye image may be generated by performing the processes by a unit of subregion (a region including at least one pixel) of the original image. That is, in another embodiment, the image data of each subregion of the original image may be copied to subregions of the destination image in the horizontal direction within a range in accordance with the value of the height of the subregion. For example, the height map may have stored therein a height for every four pixels of the original image treating four pixels of the original image as one element (in this case, the height map has a matrix of n/2×m/2). In this case, the same processes described above are performed on each subregion in which four pixels are included. That is, the subregion of the original image is copied in the horizontal direction in accordance with the height corresponding to the subregion stored in the height map. Specifically, in the case where a value of the height of the subregion including four pixels is 5, the subregion is copied up to five subregions of the destination image in the right or leftward direction. The direction of the copy process is determined depending on whether an image to be generated is the left-eye image or the right-eye image which is the same manner as described above, and also determined depending on whether the height is a positive value or a negative value. The subregion is not limited to include four pixels, and may include any number of pixels.

Further, in the present embodiment, in the case where, for example, the left-eye image is generated and if the height of the pixel is a positive value, the image data of the pixel (i, j) of the original image is copied to pixels of the destination image in the rightward direction starting from a position of a pixel of the destination image which corresponds to the pixel (i, j) of the original image. In another embodiment, in the case where, for example, the left-eye image is generated and if the height of the pixel is a positive value, the image data of the pixel of the original image may be copied to pixels of the destination image in the leftward direction within a range in accordance with the user's eye position, size of the display screen, and the position of the pixel of the original image on the display screen, starting from a pixel of the destination image which corresponds to the pixel of the original image.

FIG. 19A is a diagram showing objects present in a real space and a point of view of a user which are seen from above the space. In FIG. 19A, a left eye 110 and right eye 120 of the user, and an object 100 and an object 101 are shown. A straight line 111 and a straight line 112 delineate a field (a field of view) viewed with the left eye 110, and the left eye 110 can see a region bounded by the straight line 111 and the straight line 112 (although the actual field of view of a human eye is wider than that shown in FIG. 19A, it is assumed here that the region shown in FIG. 19A is the field of view of the human eye for the purpose of explanation). Similarly, a straight line 121 and a straight line 122 delineate a field (a field of view) viewed with the right eye 120, and the right eye 120 can see a region bounded by the straight line 121 and the straight line 122. 115 shows an extent in the horizontal direction at respective positions of the objects 100 and 101 before the objects 100 and 101 are moved, to which the left eye 110 can see, and 125 indicates an extent in the horizontal direction at respective positions of the objects 100 and 101 before the objects 100 and 101 are moved, to which the right eye 120 can see. The object 100' indicates the object 100 after the object 100 is moved in the frontward direction of the user, and the object 101' is the object 101 after the object 101 is moved in the frontward direction of the user. Furthermore, 116 indicates an extent in the horizontal direction at respective positions of the objects 100' and 101' after movement, to which the left eye 110 can see, and 126 indicates an extent in the horizontal direction at respective positions of the objects 100' and 101' after movement, to which the right eye 120 can see.

FIG. 19B is a diagram showing an extent in the horizontal direction to which the left eye 110 can see before and after movement of the objects, and respective positions of the objects in the horizontal direction in an image displayed onto the left eye 110 are shown. As shown in FIG. 19B, if the object 100 is moved in the frontward direction of the user, the object 100' after movement is moved in the rightward direction from the position of the object 100 before movement in the image displayed onto the left eye 110. As described above, this corresponds to that the pixel of the source image is copied in the rightward direction in the case where the left-eye image is generated and the height of the pixel is a positive value. On the other hand, as shown in FIG. 19B, if the object 101 is moved in the frontward direction of the user, the object 101' after movement is moved in the leftward direction from the position of the object 101 in the image displayed onto the left eye 110. Further, FIG. 19C is a diagram showing an extent in the horizontal direction to which the right eye 120 can see before and after movement of the objects, and respective positions of the objects in the horizontal direction in an image displayed onto the right eye 120 are shown. As shown in FIG. 19C, comparing the positions of the objects before and after movement, both the objects 100' and 101' after movement are moved in the leftward direction from the positions of the objects 100 and 101 before movement, respectively, in the image displayed onto the right eye 120. When the objects are thus moved in the frontward direction of the user depending on the eye position or the object positions, the positions of the objects in the image displayed onto the eye change in the left-right direction.

This is applicable to the image processing described above. If the display screen is large relative to a distance to the screen (for example, when the user sees a movie screen or a large screen TV in relatively close proximity), the direction of the copy process when generating the left and right images may be changed depending on the user's position or a display position of the displayed object. That is, in another embodiment, when determining the direction of the copy process in accordance with the image to be generated (the left-eye image or the right-eye image) and the height of the pixel, the direction of the copy process may also be determined depending on the size of the display screen, the distance from the user to the display screen, the position on the display screen, or the like.

Further, in the present embodiment, in the case where the pixel of the original image is copied to the destination image in the horizontal direction, the height of the pixel of the original image is compared with the height of the pixel of the destination image and, if the height of the pixel of the original image is higher than the height of the pixel of the destination image, the pixel of the original image is copied to the pixel of the destination image, and if the pixel of the image of the destination image is higher, the copy process ends and the processes on the next pixel of the original image is performed. That is, if the pixel of the original image is positioned in the depth direction of the screen farther than the pixel of the destination image is, the processes on the pixel of the original image end and the processes on the next pixel of the original image are performed. In another embodiment, even if the pixel of the destination image is higher, the comparison and copy processes on the pixel of the original image may be continued.

Further, in the present embodiment, the previously provided planar image is used as the original image. In another embodiment, the original image may be any image (such as, a previously provided picture, an image (picture) taken by the inner imaging section 24, a stereoscopic image (a stereoscopic photograph) taken by the outer imaging section 23, a previously provided stereoscopic image, an image in which any three-dimensional object present in the virtual space is displayed in the planar manner, a stereoscopic image taken, by the virtual stereo camera, of any three-dimensional object present in the virtual space) may be used. For example, if the stereoscopic image (that is, the left-eye image as the original image and the right-eye image as the original image) is used as the original image, the left-eye image and the height map are used to generate a new left-eye image, and the right-eye image and the height map are used to generate a new right-eye image. Specifically, one height map is set with respect to the original stereoscopic image, for example. Each element of the height map is initially set to 0. The height map is updated in accordance with the operation performed by the user. By using the updated height map, the new left-eye image is generated, by the above-described left-eye image generation process, from the left-eye image as the original image. Similarly, by using the updated height map, the new left-eye image is generated, by the above-described right-eye image generation process, from the right-eye image as the original image. On the other hand, the original stereoscopic image is an image obtained by synthesizing the left-eye image before update and the right-eye image before update which have a parallax therebetween. By performing the image generation process by using the updated height map, a parallax at a portion of each image becomes large, a parallax of another portion becomes small, or a parallax occurs at a portion in which there is originally no parallax. As described above, a portion of the original stereoscopic image can be altered in the frontward direction of the screen, or a portion of the original stereoscopic image can be altered in the depth direction of the screen.

Further, while, in the present embodiment, the height map stores therein heights of all pixels, in another embodiment, the height map may store therein heights of some pixels. For example, the height map, which stores therein heights of pixels corresponding to a region on which an operation is performed by the user, may be used. For example, when solely the lower right region of the lower LCD 12 is touched, the height map which stores therein heights of pixels included in the touched region is generated. The pixels included in the touched region are then copied to the destination image by the above processes by using the generated height map, and pixels included in the other regions are copied to the destination image with the respective positions maintained. The left-eye image and the right-eye image may be thus generated from the original image. Also, in the case where the height map corresponding to each pixel (or each subregion) is generated as in the above-described embodiment, the left and right images may be generated so that the copy process, as described above, in the horizontal direction is performed on pixels of the destination image in which respective element values of the height map thereof is not 0, and the pixel of the original image is copied to pixels of the destination image in which respective element values of the height map thereof is 0.

Further, in the present embodiment, the emboss process is performed on the left-eye image and the right-eye image, by using the height map updated in step S1. In another embodiment, the texture image of the left-eye image may be generated by using the height map which is generated during the course of the left-eye image generation process. Similarly, the texture image of the right-eye image may be generated by using the height map which is generated during the course of the right-eye image generation process. That is, the height map of the left-eye image is generated in the left-eye image generation process in step S2, and the height map of the right-eye image is generated in the right-eye image generation process in step S3. Therefore, in another embodiment, the texture image, which is used for the emboss process, may be generated by using the respective height maps generated for the left-eye and right-eye images. This generates the texture image corresponding to each image, thereby allowing the displayed stereoscopic image to have more stereoscopic effects.

Further, in the present embodiment, the height map is updated based on the touch position on the touch panel 13. In another embodiment, another coordinate designating means, such as touch pad, may be used instead of the touch panel. Also, in another embodiment, the height map may be generated according to an input by any input means such as the cross button 14A or the analog stick 15, not limiting to the coordinate designating means such as the touch panel. For example, a pointer is displayed on the upper LCD 22, and the height map is updated when an operation is performed on the pointer by using the cross button 14A, the analog stick 15, or the like, and thereby the image displayed on the upper LCD 22 may alter.

Further, the height map is not necessarily generated by the user's operation, and may be, for example, previously provided or generated depending on the status of a game (a game played by the game apparatus 10 executing the predetermined program) played in the game apparatus 10. For example, as the game played in the game apparatus 10, a game is assumed in which a player character (operated by a player) and an enemy character (operated by the game apparatus 10) fight against each other in a virtual three-dimensional space. Images taken by the virtual stereo camera present in the virtual three-dimensional space are displayed on the upper LCD 22, thereby stereoscopically displaying the player character and the enemy character on the upper LCD 22. In this case, when the enemy character attacks the player character, part of the body of the player character transforms in the direction perpendicular to the screen. In the case where such game is assumed, part of a character body may be caused to transform by using the height map. This realizes transformation by using the height map, without transforming the character model, allowing reduction in processing burden.

Further, in another embodiment, the height map may be previously provided. For example, a predetermined original image is prepared and a plurality of previously-provided height maps are applied to the predetermined original image, and thereby various stereoscopic images in which the original image is altered in the direction perpendicular to the screen can be displayed. For example, in the case where a game that has a predetermined character object is executed by the game apparatus 10, a plural types of basic images of the character object are prepared, and if a plurality of height maps are further prepared, combination of these allows representation of the character object in various display modes. This also allows reduction in type and number of basic images of the object included in the game, decrease in time period necessary for creating the game, or reduction in cost.

Further, in another embodiment, the touch operation may be performed such that the original image is displayed on the lower LCD 12 and the original image is operated. In this case, the original image displayed on the lower LCD 12 may or may not alter in the same manner as the image displayed on the upper LCD 22 alters in accordance with the touch operation performed by the user.

Further, in another embodiment, the above-described method of the image processing may be applied, not limited to game apparatuses, but also to any electronic apparatus, for example, PDAs (Personal Digital Assistant), mobile phones, personal computers, 3D TVs, and the like.

Further, in the present embodiment, the LCD capable of displaying the stereoscopically visible image which can be viewed by the naked eye is employed as the display device. In another embodiment, the present invention is applicable to viewing the stereoscopic images by glasses having the time division scheme or the deflecting scheme, the anaglyphic format (the red-blue glasses format), or the like.

Further, in another embodiment, the processes may be divided and performed by a plurality of information processing apparatuses communicatively connected by wire or wirelessly to each other, and thereby the display control system, which realizes the above-described image processing method, may be constructed. For example, the information processing apparatus is connected to an input device and a display device configured to perform stereoscopic display by wire or wirelessly to one other, and the height map may be updated by an input made on the input device. The information processing apparatus then performs the above-described image processing by using the height map, and an image on which the image processing has been performed is displayed on the display device, thereby displaying a stereoscopic image.

Further, in the embodiment described above, the processes in the flowcharts described above are performed by the information processing section 31 of the game apparatus 10 executing the predetermined program. In another embodiment, a part or the entirety of the processes may be performed by a dedicated circuit included in the game apparatus 10.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an image processing program which, when executed by a computer of an image processing apparatus for generating a stereoscopically visible image, causes the computer to perform operations comprising:
acquiring an original image;

storing depth information indicative of a subregion-by-subregion depth of the original image in association with corresponding subregions of the original image; and generating a left-eye image and a right-eye image by performing, on a subregion of the original image, a process of copying image data of the subregion of the original image to more than two subregions of a destination image in the left-right direction within a range in accordance with the depth information of the subregion of the original image, the range starting from a subregion of the destination image corresponding to the subregion of the original image, wherein the process of copying includes, when generating a particular one of the left-eye and right-eye image, copying image data of the subregion of the original image to a specified subregion of the destination image, and to a subregion to the left or to the right of a currently specified subregion in the destination image as determined based on the depth information of the subregion of the original image.

2. The non-transitory computer-readable storage medium according to claim 1, wherein the operations further comprise updating the depth information in accordance with an input from an input device.

3. The non-transitory computer-readable storage medium according to claim 2, wherein the operations further comprise updating the depth information of the subregion of the original image, which corresponds to a set of coordinates detected by the input device.

4. The non-transitory computer-readable storage medium according to claim 1, wherein the operations further comprise:

storing the depth information of the subregion of the destination image which is an image to be generated;

comparing the depth information of the subregion of the original image with the depth information of the subregion of the destination image and determining whether the subregion of the original image has a smaller depth than the subregion of the destination image;

copying the subregion of the original image to the subregion of the destination image and also copying the depth information of the subregion of the original image to the depth information of the subregion of the destination image, in the case where a determination result from the determining is affirmative; and to perform the determining and to perform the copying on each subregion of the original image.

5. The non-transitory computer-readable storage medium according to claim 1, the operations further comprising:

storing depth information of a subregion of the destination image which is an image to be generated;

specifying a subregion of the original image and a subregion of the destination image which corresponds to the subregion of the original image;

comparing the depth information corresponding to the subregion of the original image with the depth information of the subregion of the destination image, and determining whether the subregion of the original image has a smaller depth than the subregion of the destination image;

copying the subregion of the original image to the subregion of the destination image and also copying the depth information of the subregion of the original image to the depth information of the subregion of the destination image, in a case where a determination result obtained by the determining is affirmative;

specifying a subregion to the right of the subregion, which is currently specified, of the destination image as a next subregion of the destination image when generating the left-eye image;

specifying a subregion to the left of the currently specified subregion of the destination image as the next subregion of the destination image when generating the right-eye image;

causing to perform the comparing and the copying when the depth information of the subregion of the original image indicates a position in a frontward direction of a display screen;

specifying the subregion to the left of the currently specified subregion of the destination image as the next subregion of the destination image when generating the left-eye image;

specifying the subregion to the right of the currently specified subregion of the destination image as the next subregion of the destination image when generating the right-eye image;

causing to perform the comparing and the copying when the depth information of the subregion of the original image indicates a position in a depth direction of the display screen; and causing to perform the comparing and the copying on a next subregion of the original image in the case where the comparing and the copying on the subregion of the original image end.

6. The non-transitory computer-readable storage medium according to claim 5, wherein, in the case where the determining results in a determination that the subregion of the original image has a larger depth than the subregion of the destination image, the comparing and the copying on the subregion of the original image are ended and the comparing and the copying on a next subregion of the original image are performed.

7. The non-transitory computer-readable storage medium according to claim 5, wherein the operations further comprise:

changing the depth information corresponding to the subregion of the original image in accordance with the subregion of the destination image being distanced away from a position of the subregion of the original image, so that a depth of the subregion of the original image becomes closer to that of the display screen; and comparing the changed depth information corresponding to the subregion of the original image with the depth information of the subregion of the destination image to determine whether the subregion of the original image after the depth information thereof is changed has a smaller depth than the subregion of the destination image.

8. The non-transitory computer-readable storage medium according to claim 1, wherein the operations further comprise:

generating a grayscale image having intensity information by using the depth information of each subregion and the depth information of a subregion present at a position in a predetermined direction from a position of the subregion; and synthesizing the generated grayscale image with the left-eye image and the right-eye image by texture mapping.

9. The non-transitory computer-readable storage medium according to claim 8, wherein storing a grayscale value of a subregion as the depth information;

generating the grayscale image in accordance with a difference between the stored grayscale value of the subregion and a grayscale value of a subregion present at a position in the predetermined direction from a position of the subregion having the stored grayscale value.

10. An image processing apparatus for generating a stereoscopically visible image, comprising:
an imaging device for acquiring an original image;
storage configured to store depth information indicative of a subregion-by-subregion depth of the original image in association with corresponding subregions of the original image; and
an image generator configured to generate a left-eye image and a right-eye image by performing, on a subregion of the original image, a process of copying image data of the subregion of the original image to more than two subregions of a destination image in the left-right direction within a range in accordance with the depth information of the subregion of the original image, the range starting from a subregion of the destination image corresponding to the subregion of the original image, wherein the process of copying includes, when generating a particular one of the left-eye and right-eye image, copying image data of the subregion of the original image to a specified subregion of the destination image, and to a subregion to the left or to the right of a currently specified subregion in the destination image as determined based on the depth information of the subregion of the original image.

11. An image processing method for generating a stereoscopically visible image, comprising:
acquiring an original image;
storing depth information indicative of a subregion-by-subregion depth of the original image in association with corresponding subregions of the original image; and
generating a left-eye image and a right-eye image by performing, on a subregion of the original image, a process of copying image data of the subregion of the original image to more than two subregions of a destination image in the left-right direction within a range in accordance with the depth information of the subregion of the original image, the range starting from a subregion of the destination image corresponding to the subregion of the original image, wherein the process of copying includes, when generating a particular one of the left-eye and right-eye image, copying image data of the subregion of the original age to a specified subregion of the destination image, and to a subregion to the left or to the right of a currently specified subregion in the destination image as determined based on the depth information of the subregion of the original image.

12. An image processing system for generating a stereoscopically visible image, comprising:
an imaging device for acquiring an original image;
storage configured to store depth information indicative of a subregion-by-subregion depth of the original image in association with corresponding subregions of the original image; and
a processing system communicatively coupled to the imaging device and the storage including at least one processor, the processing system being configured to generate a left-eye image and a right-eye image by performing, on a subregion of the original image, a process of copying image data of the subregion of the original image to more than two subregions of a destination image in the left-right direction within a range in accordance with the depth information of the subregion of the original image, the range starting from a subregion of the destination image corresponding to the subregion of the original image, wherein the process of copying includes, when generating a particular one of the left-eye and right-eye image, copying image data of the subregion of the original image to a specified subregion of the destination image, and to a subregion to the left or to the right of a currently specified subregion in the destination image as determined based on the depth information of the subregion of the original image.

13. The apparatus according to claim 10, wherein
the image generator is further configured to store depth information of a subregion of the destination image which is an image to be generated; and
the image generator comprises:
a controller configured to specify a subregion of the original image and a subregion of the destination image which corresponds to the subregion of the original image;
a determiner configured to perform a process for comparing the depth information corresponding to the subregion of the original image with the depth information of the specified subregion of the destination image, and determining whether the subregion of the original image has a smaller depth than the specified subregion of the destination image; and
a subregion copier configured to perform a process for copying the subregion of the original image to the specified subregion of the destination image and also to copy the depth information of the subregion of the original image to the depth information of the specified subregion of the destination image, in a case where a determination result obtained by the determiner is affirmative;
wherein the controller is further configured to:
specify a subregion to the right of the subregion, which is currently specified, of the destination image as a next subregion of the destination image when generating the left-eye image;
specify a subregion to the left of the currently specified subregion of the destination image as the next subregion of the destination image when generating the right-eye image;
cause the determiner and the subregion copier to perform the respective processes when the depth information of the subregion of the original image indicates a position in a frontward direction of a display screen;
specify the subregion to the left of the currently specified subregion of the destination image as the next subregion of the destination image when generating the left-eye image;
specify the subregion to the right of the currently specified subregion of the destination image as the next subregion of the destination image when generating the right-eye image;
cause the determiner and the subregion copier to perform the respective processes when the depth information of the subregion of the original image indicates a position in a depth direction of the display screen; and
cause the determiner and the subregion copier to perform the respective processes on a next subregion of the original image in the case where the processes on the subregion of the original image end.

14. The apparatus according to claim 10, wherein the performing the process of copying image data of the subregion of the original image to more than two subregions of a destination image in the left-right direction comprises copying the image date of the subregion of the original image to a plurality of consecutive subregions of the destination image determined in accordance with the depth information of the subregion of the original image.

15. An image processing apparatus for generating a stereoscopic image, comprising:
   an imaging device configured to acquire an original image;
   storage configured to store depth information indicative of a subregion-by-subregion depth of the original image; and
   a processing system comprising at least one processor, the processing system being communicatively coupled to the imaging device and to the storage and being configured to copy image data of a subregion of the original image to more than two subregions of a destination image, the more than two subregions beginning at a starting subregion and including a number of subregions in the left-right direction, the starting subregion corresponding to the subregion of the original image, and the number of subregions determined in accordance with the depth information of the subregion of the original image, wherein the process of copying includes, when generating a particular one of the left-eye and right-eye image, copying image data of the subregion of the original image to a specified subregion of the destination image, and to a subregion to the left or to the right of a currently specified subregion in the destination image as determined based on the depth information of the subregion of the original image.

* * * * *

UNITED STATES PATENT AND TRADEMARK OFFICE
CERTIFICATE OF CORRECTION

PATENT NO.       : 8,791,946 B2                                   Page 1 of 1
APPLICATION NO.  : 13/156682
DATED            : July 29, 2014
INVENTOR(S)      : Suzuki et al.

It is certified that error appears in the above-identified patent and that said Letters Patent is hereby corrected as shown below:

On the Title page, change "(73) Assignees: Nintendo Co., Ltd., Kyoto (JP); Hal Laboratory, Tokyo (JP)" to --(73) Assignees: Nintendo Co., Ltd., Kyoto (JP); HAL Laboratory Inc., Tokyo (JP)--

Signed and Sealed this
Tenth Day of May, 2016

Michelle K. Lee
*Director of the United States Patent and Trademark Office*